United States Patent
Kaneko et al.

(10) Patent No.: US 7,672,016 B2
(45) Date of Patent: Mar. 2, 2010

(54) PREDICTING GRAININESS INDEX ON PRINTING MEDIUM WHEN PRINTING ACCORDING TO ANY INK QUANTITY SET BASED ON A GRAININESS PROFILE

(75) Inventors: Nao Kaneko, Nagano-ken (JP); Yoshifumi Arai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 492 days.

(21) Appl. No.: 11/732,988

(22) Filed: Apr. 4, 2007

(65) Prior Publication Data

US 2007/0229574 A1 Oct. 4, 2007

(30) Foreign Application Priority Data

Apr. 4, 2006 (JP) ............................ 2006-103640

(51) Int. Cl.
- *H04N 1/50* (2006.01)
- *H04N 1/56* (2006.01)
- *B41J 2/21* (2006.01)

(52) U.S. Cl. ...................... 358/1.9; 358/3.24; 358/502; 358/504; 347/19

(58) Field of Classification Search ................. 358/1.9, 358/3.24, 502, 504, 296; 347/19, 43, 101, 347/106
See application file for complete search history.

(56) References Cited

U.S. PATENT DOCUMENTS

| 6,477,892 B1 * | 11/2002 | Lindig ........................ 73/105 |
| 7,018,008 B2 * | 3/2006 | Tsujimoto ..................... 347/16 |
| 7,552,988 B2 * | 6/2009 | Yamamoto et al. ............ 347/19 |

FOREIGN PATENT DOCUMENTS

| JP | 2005-103921 | 4/2005 |
| JP | 2005-310098 | 11/2005 |
| WO | WO 2005/043884 | 5/2005 |
| WO | WO 2005/043885 | 5/2005 |
| WO | WO 2005/043889 | 5/2005 |

OTHER PUBLICATIONS

Abstract of Japanese Patent Publication No. JP 2005-103921, Pub. Date: Apr. 21, 2005, Patent Abstracts of Japan.
Abstract of Japanese Patent Publication No. JP 2005-310098, Pub. Date: Nov. 4, 2005, Patent Abstracts of Japan.

* cited by examiner

*Primary Examiner*—Scott A Rogers
(74) *Attorney, Agent, or Firm*—Martine Penilla & Gencarella, LLP

(57) ABSTRACT

A color patch that was printed based on a plurality of test ink quantity sets prepared in advance is image inputted; a graininess index is calculated based on the inputted color patch image; the graininess index on a printing medium obtained when printing is performed according to an arbitrary ink quantity set is predicted based on a graininess profile produced based on the corresponding relationship between the test ink quantity set and the graininess index.

7 Claims, 16 Drawing Sheets

(A) SPECTRAL NEUGEBAUER MODEL $$R(\lambda) = a_w R_w(\lambda) + a_c R_c(\lambda) + \cdots + a_k R_k(\lambda)$$

$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m)f_y$$
$$a_r = (1 - f_c)f_m f_y$$
$$a_g = f_c(1 - f_m)f_y$$
$$a_b = f_c f_m(1 - f_y)$$
$$a_k = f_c f_m f_y$$

(B) MURRAY-DAVIS MODEL $$f_c = f_{1D-LUT}(d_c)$$

(A) CELLULAR YULE-NIELSEN
SPECTRAL NEUGEBAUER MODEL (B) INK AREA COVERAGE (C) SPECTRAL REFLECTANCE $R_{smp}(\lambda)$ IS CALCULATED $$R_{smp}(\lambda) = \left(\sum a_i R_i(\lambda)^{1/n}\right)^n$$

$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$

$$a_{11} = (1 - f_c)(1 - f_m)$$
$$a_{12} = (1 - f_c) f_m$$
$$a_{21} = f_c (1 - f_m)$$
$$a_{22} = f_c f_m$$

|  | DIGITAL VALUES OF INK QUANTITY | | | |
|---|---|---|---|---|
| CYAN | 0 | 50 | 168 | 255 |
| MAGENTA | 0 | 56 | 173 | 255 |
| YELLOW | 0 | 49 | 162 | 255 |
| BLACK | 0 | 56 | 126 | 255 |
| LIGHT CYAN | 0 | 43 | 182 | 255 |
| LIGHT MAGENTA | 0 | 64 | 186 | 255 |

FIG. 14

$$R(\lambda) = \{a_w R_w(\lambda)^{1/n} + a_c R_c(\lambda)^{1/n} + a_m R_m(\lambda)^{1/n} + a_b R_b(\lambda)^{1/n}\}^n$$

$$a_w = (1 - f_c)(1 - f_m)$$
$$a_c = f_c(1 - f_m)$$
$$a_m = (1 - f_c)f_m$$
$$a_b = f_c f_m$$

| C | M | Y | K | lc | lm | GI |
|---|---|---|---|----|----|----|
| 0 | 0 | 0 | 0 | 0 | 0 | 2 |
| 128 | 0 | 0 | 0 | 0 | 0 | 2.3 |
| 256 | 0 | 0 | 0 | 0 | 0 | 2.1 |
| 0 | 128 | 0 | 0 | 0 | 0 | 2.3 |

LUT(200)

FIG. 16

PREDICTING GRAININESS INDEX ON PRINTING MEDIUM WHEN PRINTING ACCORDING TO ANY INK QUANTITY SET BASED ON A GRAININESS PROFILE

The entire disclosure of Japanese Patent Application No. 2006-103640, filed Apr. 4, 2006, is expressly incorporated by reference herein.

BACKGROUND

1. Technical Field

The present invention relates to a graininess prediction technology and a profile production technology for printers.

2. Related Art

A conventional technology for predicting the graininess is known by which an ink quantity set is subjected to half tone processing, an ink dot distribution on a printing paper is estimated, and the graininess is quantitatively determined based on the ink dot distribution (for example, see Japanese Patent Application Laid-open No. 2005-103921). On the other hand, a method is known by which a color patch is actually printed with a printer, the color patch is scanned and the image thus obtained is analyzed, thereby determining the graininess quantitatively (for example, see Japanese Patent Application Laid-open No. 2005-310098).

When a profile is produced that provides an ink quantity set with good graininess, the graininess has to be determined for a large number of ink quantity sets that include the entire range of ink quantity spaces that can be used by a printer, and an optimum ink set has to be selected. The resultant problem is that it is difficult to perform the simulation and form/evaluate the color patches with respect to a large number of ink quantity sets.

SUMMARY

A plurality of ink quantity sets are prepared and color patches relating to these test ink quantity sets are printed. The printed color patches are inputted as images, and graininess indexes are calculated based on the inputted images. As a result, a corresponding relationship between each ink quantity set and graininess index can be obtained. Then, a graininess profile that enables the prediction of a graininess index for an arbitrary ink quantity set is produced based on the corresponding relationship between the test ink quantity sets and graininess indexes. With such a graininess profile, the graininess index can be predicted for an arbitrary ink quantity set, without actually printing the color patch. Furthermore, because the graininess profile is produced based on the results obtained in actually printing the color patches on the printer, the error characteristic of the printer also can be reflected in the graininess index that is predicted.

The present invention places no limitation on the format of graininess profile. For example, a graininess profile may be specified by a neural network. In order to create a neural network, master signals are necessary to optimize each parameter, but the corresponding relationship between the test ink quantity set and graininess index specified in advance can be sued as the master signal. Thus, a neural network serving as a graininess profile may be learned based on the corresponding relationship between the test ink quantity set and graininess indexes. With a neural network, the graininess index can be accurately predicted even when the graininess index changes nonlinearly and in a complex manner.

When a neural network is created as a graininess profile, each parameter constituting the neural network has to be optimized. The initial neural network can be formed by setting the parameters randomly. A graininess index can be obtained by inputting a test ink quantity set into the neural network that was formed, but the result will be different from the graininess index obtained by actually evaluating the color patches. It is preferred that this error be minimized, and the optimization of parameters is performed to reduce the error. Further, the parameters in the neural network mean the total number of networks, the number of elements constituting an interlayer, or the size of bias or weight. The neural network structure can be uniquely defined by setting these parameters.

Due to properties of printers or image input devices for color patches, the graininess indexes obtained by evaluating color patches inevitably include a noise. In this case, if the attention is focused on reducing the difference with the graininess index that was obtained by actually evaluating the color patches, a neural network will be configured that will directly reflect the effect of the noise, and the outputted graininess index will become inaccurate, rather than more accurate. Generally, when the number of ink quantity sets is small, the neural network becomes over-fitting and affected by the noise. Therefore, when the graininess indexes outputted from the neural network fluctuate rapidly due to the effect of the noise, it is desired that the parameters be so set as to inhibit such fluctuations. This being done, the number of ink quantity sets can be decreased and labor required for printing and evaluating the color patches can be saved. More specifically, when optimality of each parameter is judged, it is better to consider not only the error indicator between the graininess index outputted from the neural network and the graininess index that was obtained by actually evaluating the color patches, but also an indicator for inhibiting the over-fitting. Furthermore, when optimality of each parameter is judged, a hyper-parameter may be provided that can determine which indicator from amongst the error indicator and the indicator inhibiting the over-fitting is to be considered more important.

As a separate specific example of graininess profile, the graininess profile can be also realized by a lookup table. Thus, because the corresponding relationship between the test ink quantity set and the graininess index obtained by evaluating the color patches has been obtained in advance, a lookup table describing this correspondence relationship can be created. Because only some of ink quantity sets are prepared as the test ink quantity sets, the correspondence relationship with the graininess index cannot be described for all the ink quantity sets, but a graininess index relating to an arbitrary ink quantity set can be obtained by performing interpolation. Furthermore, when the transition of graininess indexes from one ink quantity set to another can be approximated with an approximate equation, then, the graininess profile may be established by this approximate equation. For example, it is possible to predict the graininess index for an arbitrary ink quantity set with a polynomial expression using ink quantities as variables.

The present invention can be implemented in a variety of modes, examples thereof including a method for predicting graininess, an apparatus for predicting graininess, a computer program for realizing the functions of these method and apparatus, a recording medium for recording the computer program, and a data signal that includes the computer program and is implemented within a carrier wave. Furthermore, each process in accordance with the present invention can be incorporated in a profile production method relating to a printer. In this case, too, the graininess index can be predicted accurately and the graininess index can be used for creating the profile.

As an example of such profile production method, a plurality of ink quantity sets are prepared, the advantageous ink quantity set from amongst these ink quantity sets is selected as a sample ink quantity set, and a profile is produced based on the selected ink quantity set. With such a method, the profile can be produced based on the advantageous sample ink quantity set, and good printed image can be obtained by color conversion that uses the profile. The degree of advantageousness of each ink quantity set can be determined based at least on the graininess index of each ink quantity set. The graininess index of each ink quantity set determined herein can be predicted with the graininess profile obtained by the above-described method.

BRIEF DESCRIPTION OF THE DRAWINGS

FIG. 14 illustrates grid point coordinates of cell division in the Cellular Yule-Nielsen Spectral Neugebauer Model;

FIG. 16 illustrates an example of LUT.

DESCRIPTION OF EXEMPLARY EMBODIMENTS

An embodiment of the present invention will be explained below in the order as follows:
A. First embodiment.
B. Application to profile production.
C. Example of spectral printing model.
D. Modification example.
E. Conclusion.

A. First Embodiment

Figure 1:
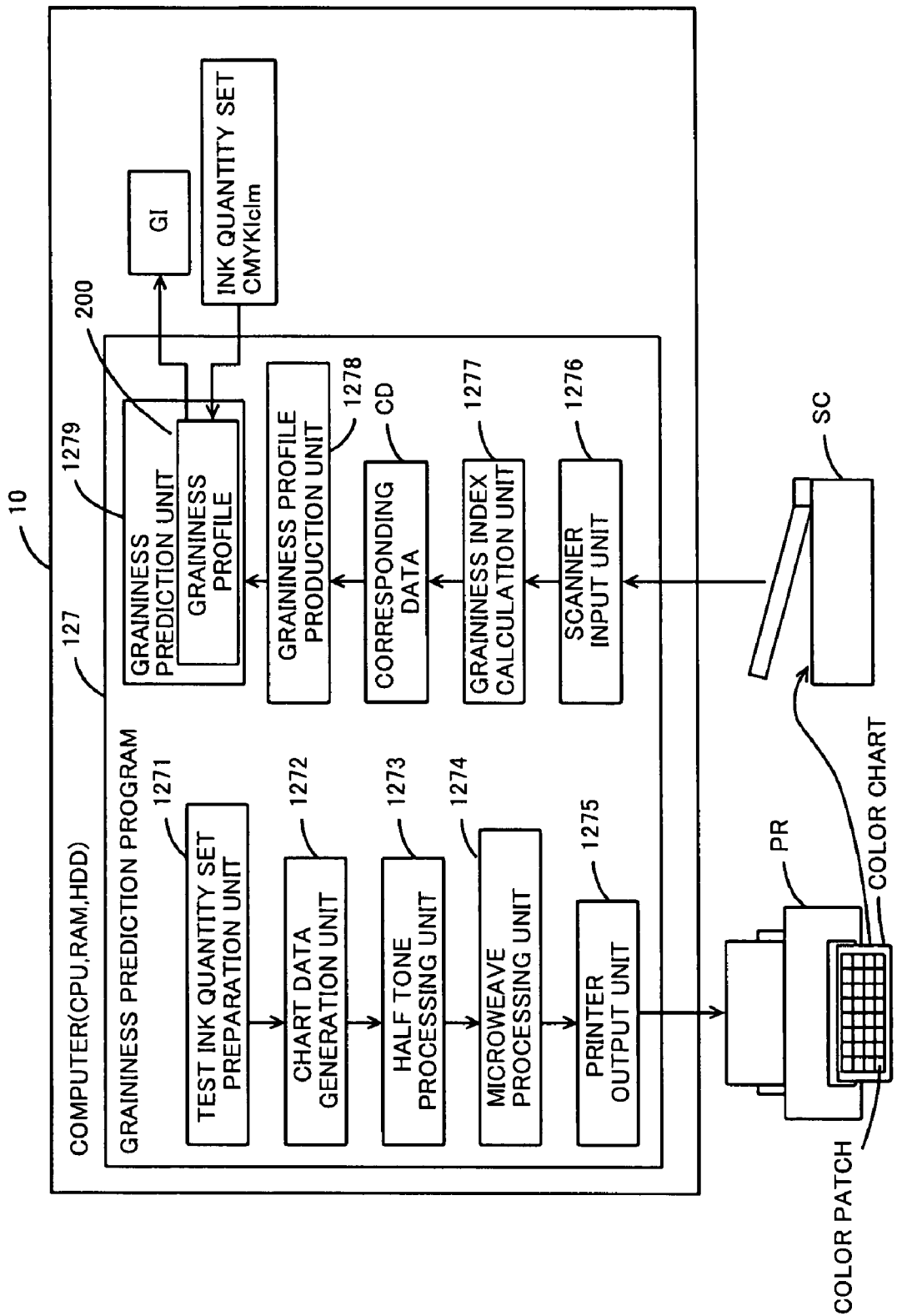
FIG. 1 is a block diagram illustrating by way of an example a configuration of a graininess prediction apparatus.

FIG. 1 illustrates the configuration of a graininess prediction apparatus of the first embodiment of the present invention. In the figure, the graininess prediction apparatus is realized by means of a computer 10, and the computer 10 predicts a graininess by executing a graininess prediction program 127. The computer 10 executes the graininess prediction program 127, while using a RAM in a CPU (not shown in the figure) as a work area, and stores the data necessary for each processing in a storage device such as a HDD (not shown in the figure).

The graininess prediction program 127 comprises a test ink quantity set preparation unit 1271, a chart data generation unit 1272, a half tone processing unit 1273, a microweave processing unit 1274, a printer output unit 1275, a scanner input unit 1276, a graininess index calculation unit 1277, a graininess profile production unit 1278, and a graininess prediction unit 1279. The printer output unit 1275 can output printing data to an ink-jet printer PR, and the scanner input unit 1276 can input the image data that were image inputted by a scanner SC. The test ink quantity set preparation unit 1271 prepared a plurality of test ink quantity sets for performing graininess evaluation. The chart data generation unit 1272 generates as a color chart data the image data by which the pixel region corresponding to each color patch was filled via pixels of the test ink quantity set.

The half tone processing unit 1273 converts the color chart data into image data (half tone data) of a gradation indicating whether the ink discharge is possible or not. The microweave processing unit 1274 decomposes each pixel row of half tone data into raster data of each scanning pass and generates the printing data. The graininess index calculation unit 1277 performs spatial frequency analysis of image data of the color patches obtained from the scanner and calculates the graininess index GI corresponding to each test ink quantity set. The graininess profile production unit 1278 produces a graininess profile 200 based on the correspondence relationship with the graininess index GI corresponding to each test ink quantity set. The graininess prediction unit 1279 uses the graininess profile 200 to calculate the graininess index GI for an arbitrary ink quantity set.

Figure 2:
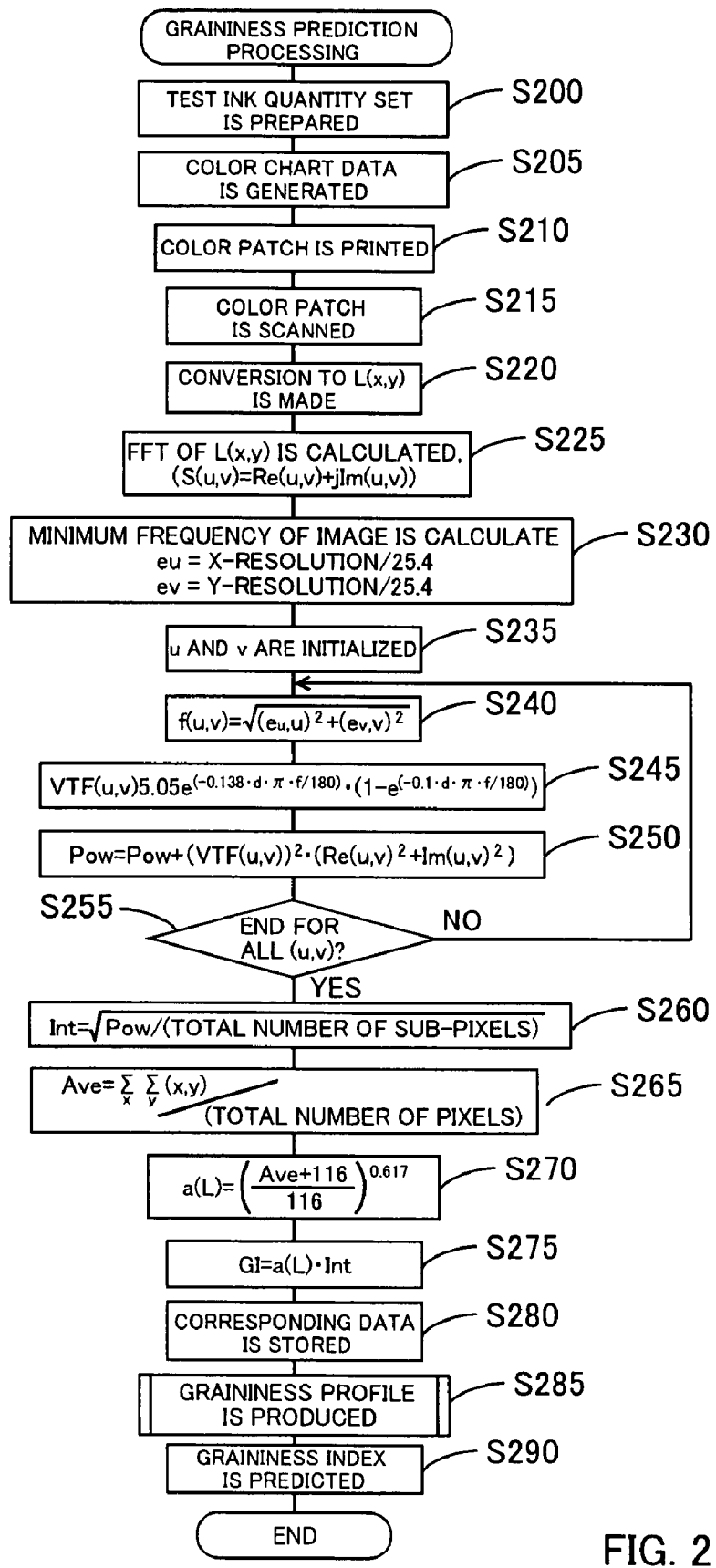
FIG. 2 is a flowchart illustrating by way of an example a processing procedure relating to prediction of graininess.

FIG. 2 shows the flow of graininess profile generation processing. In step S200, the test ink quantity set preparation unit 1271 generates randomly a large number (N) of test ink quantity sets. Here, a large number of ink quantity sets may be prepared so that no nonuniform distribution occurs in the ink quantity space, but the generated test ink quantity set may be also inputted into the below-described spectral printing model converter 100 (FIG. 7) and color calculation unit 122 (FIG. 7) and the test ink quantity sets may be so prepared that the color measurement value under a certain light source is uniformly distributed in the printer gamut. In the present embodiment, cyan (C), magenta (M), yellow (Y), black (K), light cyan (lc), and light magenta (lm) are taken as an ink set, test ink quantity sets that are uniform in the CMYKlclm ink quantity space are prepared.

In step S205, the chart data generation unit 1272 generates the color chart data. A color patch is, for example, a color object printed to have a rectangular shape on a printing paper, and printing within the same color patch is performed according to the same test ink quantity set. Thus, a region equivalent to a color patch in the corresponding pixel data is filled with pixels having a gradation of the same test ink quantity set. In the present embodiment, with consideration for time and efforts required for printing and evaluation, color chart data are generated such that a plurality of color patches are disposed in a plurality of different positions on the same printing paper. If the color chart data can be generated, then the resolution conversion is performed to a printing resolution for which the same color chart was set.

In step S210, the color chart data are actually outputted to the printer PR by the half tone processing unit 1273, microweave processing unit 1274, and printer output unit 1275. A printing medium for use in printing can be set for the printer PR, and a color chart is formed on the printing medium that was set. In step S215, the color chart is scanned with the scanner SC. Here, the scanning is performed with a resolution higher than that at the time the color chart was printed with the printer. As a result, image data that enable the detailed understanding of the ink dot distribution state in each color patch can be obtained by the scanner input unit 1276. It is preferred that the scanned image data be converted into device-independent image data such as a CIELAB color system by using an input device profile of the scanner SC. In step S220, the scanned image data are converted into the image data L(x, y) of lightness distribution on the printing medium. The graininess index calculation unit 1277 then calculates the graininess index value GI based on the image data L(x, y).

Figure 3:
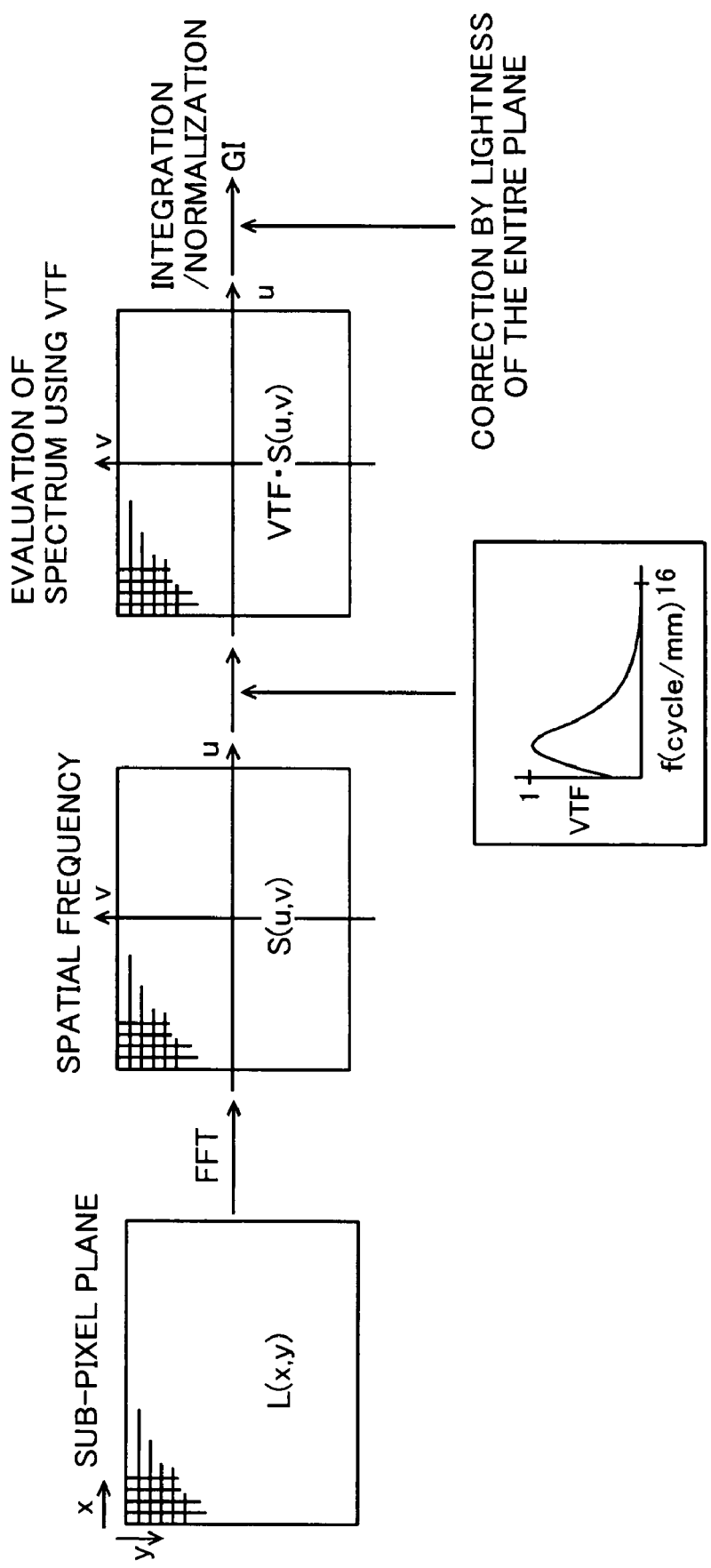
FIG. 3 is an explanatory drawing illustrating by way of an example the state of GI computation.

FIG. 3 illustrates how the graininess index GI is calculated. In the present embodiment, the graininess index GI is calculated by evaluating the image lightness with a spatial frequency (cycle/mm). For this purpose, first, a FFT (Fast Fourier Transformation) is implemented with respect to the lightness L(x, y) shown at the left end of FIG. 3 (step S225). FIG. 2 and FIG. 3 show the spectrum of the spatial frequency obtained as S(u, v). The spectrum S(u, v) is composed of a real part Re(u, v) and an imaginary part Im(u, v), wherein S(u, v)=Re(u, v)+jIm(u, v). The spectrum S(u, v) is equivalent to the above-described Wiener spectrum.

Here, (u, v) has the dimension of the inverse space (x, y), but in the present embodiment, (x, y) are defined as coordinates, and the resolution and other parameters of the scanner SC have to be taken into account in order to ensure correspondence to the actual length dimension. Therefore, the conversion of dimensions is also necessary in the case where the S(u, v) is evaluated by the dimension of spatial frequency. First, the size f (u, v) of the spatial frequency corresponding to coordinates (u, v) is calculated. Thus, the lowest frequency $e_u$ in the main scanning direction is defined as (X resolution)/25.4, and the lowest frequency $e_v$ in the secondary scanning direction is defined as (Y resolution)/25.4. The X resolution and Y resolution are resolutions at the time of scanning with the scanner SC. Here, 1 inch is taken as 25.4 mm. If the lowest frequency eu, ev in each scanning direction is calculated, then the size f (u, v) of the spatial frequency in any coordinate (u, v) can be calculated as $((e_u \cdot u)^2+(e_v \cdot v)^2)^{1/2}$.

On the other hand, sensitivity to lightness differs according to the size f(u, v) of the spatial frequency between people, and the spatial frequency characteristic of vision is, for example, a characteristic such as VTF(f) shown in the lower section in the center of FIG. 3. The VTF(f) in FIG. 3 is as follows: VTF(f)=5.05×exp(−0.138·d·π·f/180)×(1−exp(−0.1·d·π·f/180). Here, d is the distance from the eye to the printing matter, and f is the size f of the spatial frequency. Because f is presented as the above-mentioned function of (u, v), the spatial frequency characteristic VTF of vision can be taken as a function VTF(u, v) of (u, v).

If the above-described spectrum S(u, v) is multiplied by VTF(u, v), then the spectrum S(u, v) can be evaluated in a state in which the spatial frequency characteristic of vision is taken into account. Further, if the evaluation result is integrated, then the spatial frequency can be evaluated with respect to the entire sub-pixel plane. Accordingly, in the present embodiment, in the processing of steps S235-S255, the processing preceding the integration is performed, first, both coordinates in (u, v) are initialized to "0" (step S235) and a spatial frequency f(u, v) in a certain coordinate (u, v) is calculated (step S240). Then, the VTF at this spatial frequency f is calculated (step S245).

Once the VTF has been obtained, the second power of the VTF is multiplied by the second power of the spectrum S(u, v), and the sum with a variable Pow for substituting the integration results is calculated (step S250). Thus, because the spectrum S(u, v) includes the rear part Re(u, v) and the imaginary part Im(u, v), first, the integration is performed with the second power of VTF and the second power of spectrum S(u, v) in order to evaluate the size of the spectrum. Then, it is determined whether the above-described processing has been performed with respect to all the coordinates (u, v) (step S255), and if it is not determined that the processing has been completed with respect to all the coordinates (u, v), the unprocessed coordinates (u, v) are extracted and the processing of step S240 and subsequent steps is repeated. If the size of the spatial frequency increases as shown in FIG. 3, then the VTF decreases rapidly and becomes almost "0". Therefore, the computation can be carried out in a necessary and sufficient range by limiting the value region of coordinates (u, v) in advance to below the predetermined value.

Once the integration has been completed, the ratio of $Pow^{1/2}$/(total number of pixels) is calculated (step S260). Thus, a square root is taken of the variable Pow to return to the dimension of the size of the spectrum S(u, v), and then normalization is performed by dividing by the total number of pixels. With such a normalization, an objective index (Int in FIG. 3) that does not depend on the number of pixels of the original half tone data is calculated. In the present embodiment, the graininess index GI is then obtained by performing correction that takes into account the effect of lightness of the entire printed patter. Thus, in the present embodiment, the correction is performed such that even if the spatial frequency spectrum is the same, different printed images are viewed by the human eye when the entire printer matter is light or dark and the graininess is easier felt when the entire printed matter is light. For this purpose, first, the average Ave lightness of the entire image is calculated by adding up the lightness L(x, y) for all the pixels and dividing by the number of pixels (step S265).

Further, the correction coefficient a(L) based on the lightness of the entire image is defined as $a(L)=((Ave+16)/116)^{0.8}$, the correction coefficient a(L) is calculated (step S270), and the result is multiplied by the aforementioned Int to obtain a graininess index GI (step S275). The correction coefficient a(L) is equivalent to the above-described lightness correction term $a_L$. Further, the correction coefficient may be a function such that the value of the coefficient increases or decreases by averaging the lightness, and a variety of other functions can be also employed. It goes without saying, that the components for evaluating the graininess index GI are not limited to the lightness component, and the spatial frequency may be evaluated by taking into account the hue and chromaticity component. The graininess index GI may be calculated by calculating a lightness component, a red-green component, and a yellow-blue component as chroma values, subjecting then to Fourier transformation, and then multiplying by the spatial frequency of vision that was defined in advance for each color component.

The graininess of the printed color patch is thus quantitatively represented by the graininess index GI by the above-described processing of steps S205-S275. By performing the processing of steps S205-S275 with respect to color patches printed according to a plurality of ink quantity sets generated in step S200, the graininess index GI relating to each test ink quantity set can be obtained. In step S280, a correspondence data CD is stored that records the corresponding relationship between each test ink quantity set and the graininess index GI. In step S285, the graininess profile production unit 1278 conducts the processing of producing the graininess profile 200 based on the correspondence data CD.

Figure 4:
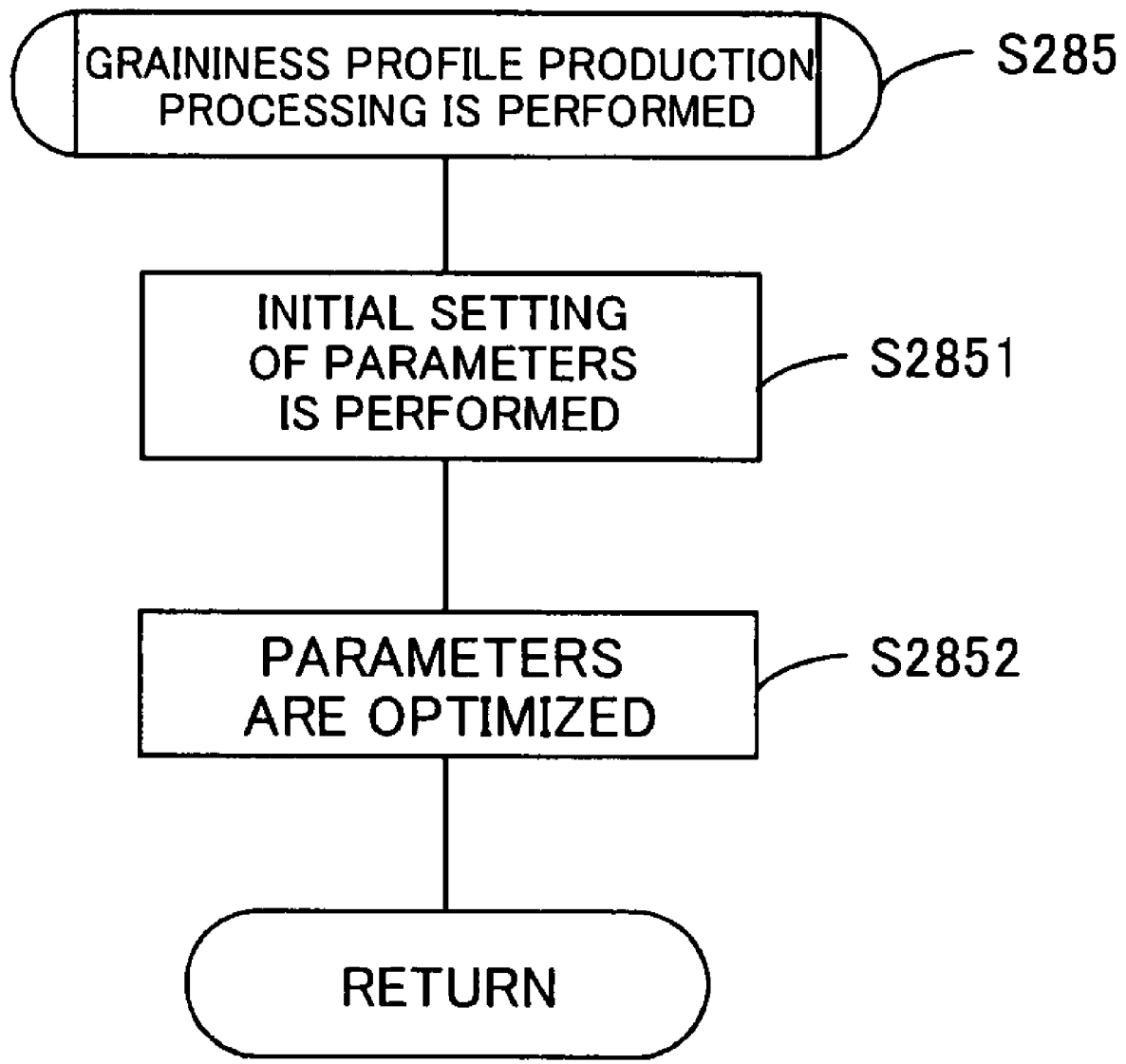
FIG. 4 is a flowchart illustrating by way of an example the flow of graininess profile production processing.
Figure 5:
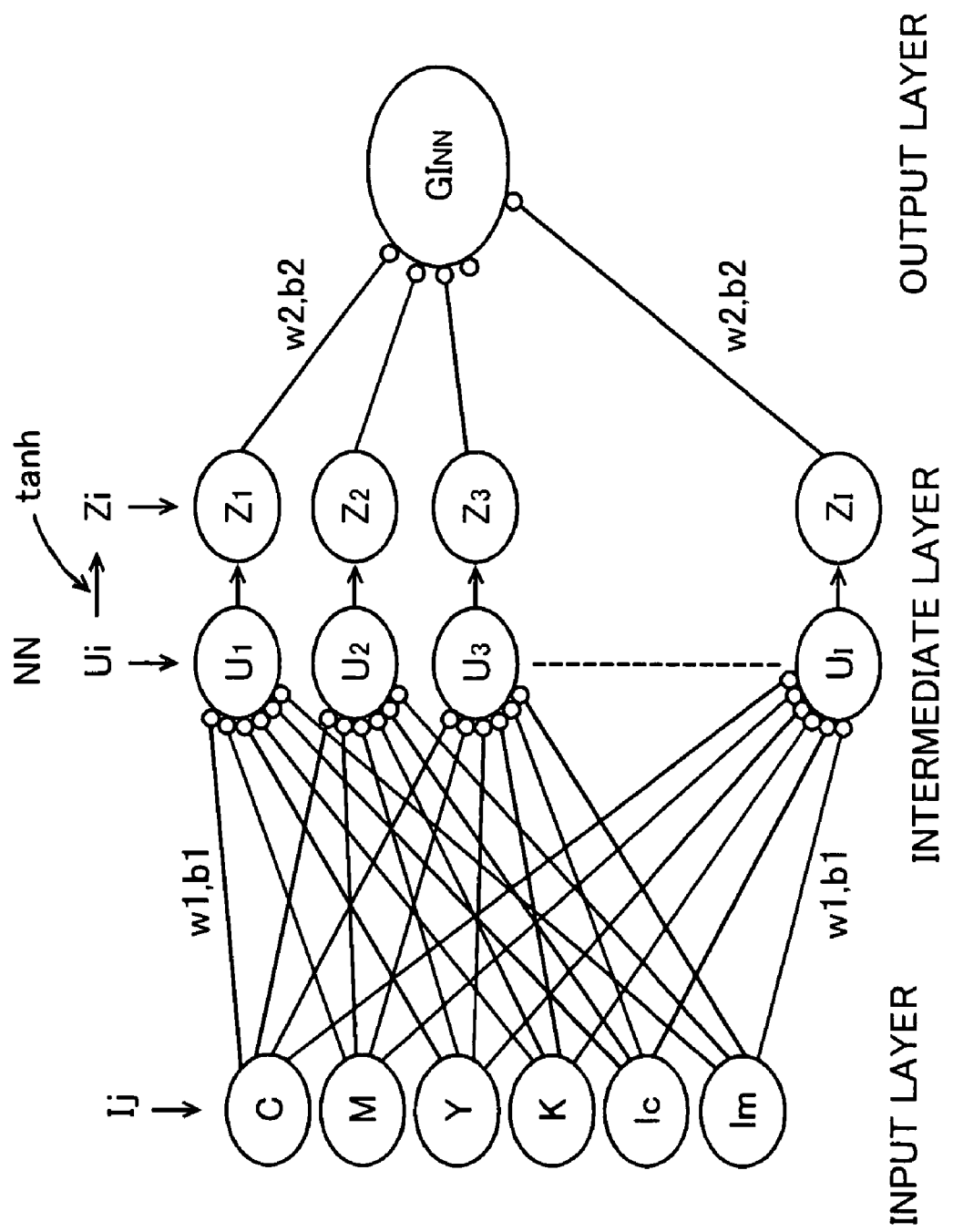
FIG. 5 illustrates by way of an example a neural network structure.

FIG. 4 is a flowchart of the graininess profile production processing. FIG. 5 shows a structure of a neural network (NN) as a graininess profile in the present embodiment. In step S285, shown in FIG. 4, the initial setting of each parameter determining the NN structure is performed. In the NN of the present embodiment, the input layer is an ink quantity vector $I_j$=(C, M, Y, K, lc, lm), (j=1-6). On the other hand, the output layer becomes a graininess index GI. The NN of the present embodiment has a three-layer structure in which a monolayer interlayer is set and the number of intermediate units constituting the interlayer can be set arbitrarily. Representing an intermediate unit by $U_i$ (m=1-I), the total number I (for example, I=23) is set in step S2851. Generally, if the number of intermediate units $U_i$ is less than the number of master signals, the trend to under-fitting is strengthened. Therefore, it is preferred that the appropriate number I of the intermediate units $U_i$ be set by taking into consideration the number N of the test ink quantity sets that were generated in step S200.

Each intermediate unit $U_i$ will be assumed to be represented by the following Equation (1)

$$U_i = \sum_{j=1}^{J} I_j W1_{ij} + b1_i \quad (1)$$

In Equation (1), each intermediate unit $U_i$ has a weight $W1_{ij}$ inherent to each ink quantity $I_j$, and the intermediate units are obtained by multiplying each ink quantity $I_j$ by the weight $W1_{ij}$ and combining the products linearly. Further, each intermediate unit $U_i$ has an inherent bias $b1_i$, and the bias $b1_i$ is added to the linear combination of ink quantities $I_j$. The initial setting of all the weights $W1_{ij}$ and biases $b1_i$ is performed in step S2851. At the initial stage, the weight $W1_{ij}$ and bias $b1_i$ may be determined in any way. For example, the weight $W1_{ij}$ and bias $b1_i$ may be dispersed according to a normal distribution having 0 as a frequency average.

The finally obtained graininess index GI is assumed to be represented by the following Equation (2).

$$GI = \sum_{i=1}^{I} Z_i W2_i + b2 \quad (2)$$

The graininess index GI in Equation (2) has an inherent weight $W2_i$ for each intermediate unit $U_i$ and the graininess index is obtained by multiplying the output value $Z_i$ from each intermediate unit $U_i$ by the weight $W2_i$ and combining the products linearly. The bias b2 is added in a similar manner. The initial setting of each weight $W2_i$ and bias b2 is performed in step S2851. The relationship between the intermediate unit $U_i$ and the output value $Z_i$ can be represented by the transfer function of Equation (3) below.

$$Z_i = \tan h(U_i) \quad (3)$$

The transfer function may be a differentiable monotonously growing continuous function, and a linear function also can be employed. In the present embodiment, a nonlinear hyperbolic tangent function is set to obtain a nonlinear output. It goes without saying that a sigmoid function can be also used. The initial setting of all the weights $W2_i$ and biases b2 is also performed in step S2851. At the initial stage, the weight $W2_i$ and bias b2 may be determined in any way. In this case, too, the weight $W2_i$ and bias b2 may be dispersed according to a normal distribution having 0 as a frequency average. The NN structure is created by initially setting each parameter in the above-described manner. However, because each parameter is set appropriately, they have to be learned and optimized with the correspondence data CD that is based on actual evaluation of color patches.

Accordingly, the optimization of parameters is performed in step S2852. Here, the optimization of parameters $W1_{ij}$, $b1_i$, $W2_i$, b2 is performed by an error back propagation method. With the error back propagation method, an error between the output (graininess index GI) with respect to the input (test ink quantity set) in the correspondence data CD and the graininess index GI outputted when a test ink quantity set is inputted in the NN is successively transferred to the layer of the preceding gradation, thereby successively determining the parameters of each layer. As a base guideline, the parameters $W1_{ij}$, $b1_i$, $W2_i$, b2 are optimized so as to minimize the aforementioned error, whereby the graininess index $GI_{NN}$ predicted in the NN assumes a value close to the graininess index GI obtained by actual evaluation. However, when this guideline is followed, if the graininess index GI obtained by actual evaluation contains noise, the noise is also reproduced in the NN output. Thus, over-fitting occurs. Accordingly, the evaluation function E represented by Equation (4) below is used to inhibit the over-fitting.

$$E = \beta E_D + \alpha E_w \quad (4)$$

The slope of the evaluation function E is then found by partial differentiation of the evaluation function E by a parameter p that is the optimization object, while changing the parameter p, and the value of the parameter p at which the absolute value of the slope is reduced to a minimum is taken as the parameter p after optimization (slope method). As a result, a parameter p at which the evaluation function E is reduced to a minimum in fluctuations of the parameter p that is the optimization object can be specified. A parameter from amongst the parameters $W1_{ij}$, $b1_i$, $W2_i$, b2 that is the optimization object is represented by the parameter p, and the parameter p that is the optimization object is set sequentially in the order of proximity from the output. If all the parameters $W1_{ij}$, $b1_i$, $W2_i$, b2 are sequentially optimized, the same processing is repeated the prescribed number of times or until the evaluation function E become below the predetermined threshold. As a result, the evaluation function E can be converged to a small value, while reflecting the interaction between the parameters $W1_{ij}$, $b1_i$, $W2_i$, b2.

Further, $E_D$ is an error function for evaluating the error of graininess indexes $GI_{NN}$, GI. This function is represented by Equation (5) below.

$$E_D = \frac{1}{2} \sum_{n=1}^{N} (GI_{NNT}^n - GI^n)^2 \quad (5)$$

Thus, the error function $E_D$ is represented by the second power of the error of the graininess indexes $GI_{NN}$, GI with respect to all the test ink quantity sets (n is a test ink quantity set number, n=1-N). The graininess index $GI_{NN}$ is obtained by successively inputting the test ink quantity set into the input layer of the NN. By minimizing the evaluation function E including the error function $E_D$, the displacement between the graininess index GI obtained by actual evaluation and the graininess index $GI_{NN}$ that is outputted by the NN can be minimized with respect to an arbitrary ink quantity set including the ink quantity space. Further, when the evaluation function E does not become below the desired threshold even when the optimization is repeated the prescribed number of times, the number I of intermediate units $U_i$ may be increased to improve the fitting capacity. Conversely, when the evaluation function E becomes less than the desired threshold after a very small number of optimization cycles, the number I of intermediate units $U_i$ may be increased to inhibit the fitting capacity.

On the other hand, $E_w$ is an inhibition function for inhibiting the over-fitting of the graininess index $GI_{NN}$ based on the NN with respect to the graininess index GI based on actual evaluation. This function is represented by Equation (6) below.

$$E_W = \frac{1}{2}\sum_{s=1}^{S}(p_s)^2 \quad (6)$$

In Equation (6) the inhibition function $E_W$ is represented by the sum of second powers of parameter $p_s$ that are the optimization objects. The index s (s=1-S) in this equation means the number of parameters p of the same kind. For example, when the weight $W2_i$ is taken as a parameter p that is an optimization object, then i (i=1-I) is equivalent to s (s=1-S). According to Equation (6), the parameter $p_s$ can be converged to 0 by minimizing the evaluation function E that includes the inhibition function $E_W$. If the absolute value of the weights $W1_{ij}$, $W2_i$ in NN increases, the curvature of the fluctuation curve of the outputted graininess index $GI_{NN}$ become abrupt. In such a case, there is a high probability of the abnormal master signal containing noise (graininess index GI) of producing an undesirable effect. Therefore, the curve of the graininess index $GI_{NN}$ can be smoothed and over-fitting caused by the graininess index GI containing noise can be inhibited by converging the weights $W1_{ij}$, $W2_i$ to 0 with the inhibition function $E_W$.

Here, in Equation (4), $\alpha$, $\beta$ can be taken as coefficients (hyper-parameters) for adjusting the weights of the error function $E_D$ and inhibition function $E_W$ in the evaluation function E. The hyper-parameters $\alpha$, $\beta$ are given by the following Equation (7) and Equation (8).

$$\alpha = \frac{\gamma}{2E_W} \quad (7)$$

$$\beta = \frac{N-\gamma}{2E_D} \quad (8)$$

$\gamma$ in Equation (7) and Equation (8) above is represented by the following Equation (9)

$$\gamma = \sum_{s=1}^{S}\frac{\lambda_s}{\lambda_s + \alpha} \quad (9)$$

Further, $\lambda_s$ of Equation (9) above is an intrinsic value of a hessian matrix comprising S rows×S column that was obtained by second-order differentiation of the error function $E_D$ by the parameter $p_s$ that is the optimization object. This intrinsic value $\lambda_s$ can be said to reflect the slope fluctuations of the error function $E_D$ relating to the parameter $p_s$. When the slope fluctuations of the error function $E_D$ are large, the hyper-parameter $\alpha$ becomes large and the inhibition function $E_W$ gains importance. Conversely, when the slope fluctuations of the error function $E_D$ are small, the hyper-parameter $\beta$ becomes large and the inhibition function $E_D$ gains importance.

Thus, when the graininess index $GI_{NN}$ outputted by the NN abruptly starts or stops tracing the graininess index GI that is actually evaluated, there is a high probability that the graininess index GI based on actual evaluation of the periphery thereof will be abnormal (large effect of noise), and in this case the weight of the inhibition function $E_W$ is increased. As a result, the unreasonable fitting can be prevented with respect to the abnormal graininess index GI and a NN output with a high degree of smoothness can be obtained. It is preferred that the hyper-parameters $\alpha$, $\beta$ be updated once the optimization of the parameters advances to a certain stage.

If the parameters $W1_{ij}$, $b1_i$, $W2_i$, b2, I are set as described hereinabove, the NN structure is established and the NN as a graininess profile 200 is produced. Because the graininess is affected by a printing matter and printing resolution during printing of the color chart in step S210, and also a half tone processing mode, a microweave processing mold, and an ink set, the prediction based on the graininess profile 200 is effective only when these conditions match. Therefore, the above-described printing conditions are stored in association with the graininess profile 200 so that they can be identified when the graininess profile 200 is used.

In step S290 of FIG. 2, the graininess prediction unit 1279 performs graininess prediction with respect to an arbitrary ink quantity set. Thus, by inputting an arbitrary ink quantity set into the produced NN, the graininess index corresponding to this ink quantity set is calculated. The graininess index $GI_{NN}$ is calculated essentially by performing the computation with Equations (1)-(3) with respect the an arbitrary ink quantity set. By using the NN as in the present embodiment, the unknown graininess index $GI_{NN}$ can be predicted for an arbitrary ink quantity set in an easy manner and with high accuracy. Further, because the NN has been constructed based on the color chart actually printed with the printer PR, the graininess index $GI_{NN}$ can be predicted by taking into account the stationary error characteristic of the printer PR. Furthermore, because over-fitting is inhibited according to Equation (4), the effect of noise can be prevented even with a small test ink quantity set, the number of necessary color patches can be reduced, and time and efforts necessary for printing and scanning can be reduced.

Figure 6:
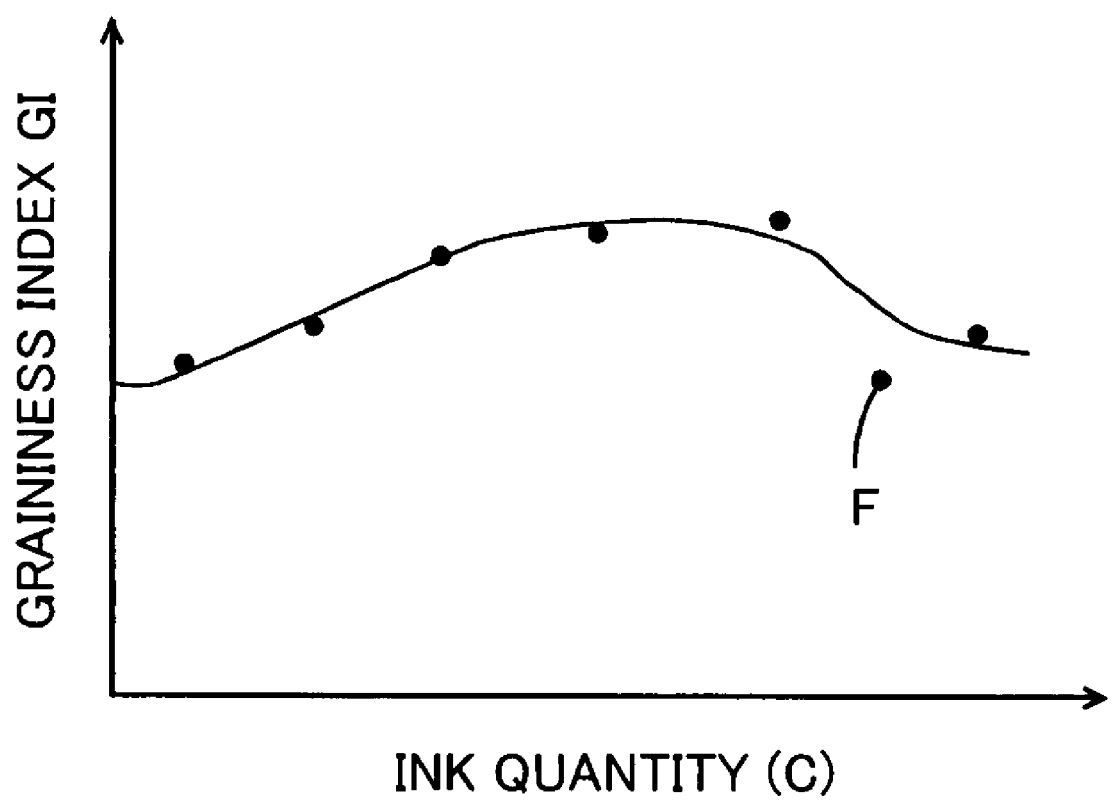
FIG. 6 is a graph illustrating by way of an example the state of fitting with a NN.

FIG. 6 shows how the graininess index $GI_{NN}$ is fitted with the NN of the present embodiment. In the figure, the graininess index GI is plotted against the ordinate, and the ink quantity of C ink is plotted against the abscissa. Further, the transition of the graininess index $GI_{NN}$ obtained with the NN is shown by a solid line, and the graininess index GI obtained by actual evaluation is plotted with points. Because learning of parameters is performed with a large number of graininess indexes GI obtained by actual evaluation, the graininess index $GI_{NN}$ basically passes in the vicinity of the graininess index GI obtained by actual evaluation. However, because the over-fitting has been inhibited by using Equation (4), for example, even when the graininess index GI obtained by actual evaluation that was affected by the noise such as shown in point F in the figure is present in the correspondence data CD, the over-fitting with respect to this point F can be inhibited, the fluctuations of a smooth graininess index $GI_{NN}$ can be predicted, and a prediction that is closer to true values can be made. Thus, when such noise-containing graininess index GI is present, slope fluctuations of the error function ED are large and the hyper-parameter $\alpha$ also becomes large and, therefore, the inhibition function $E_W$ gains importance. If the inhibition function $E_W$ gains importance, the action causing the weights $W1_{ij}$, $W2_i$ to converge to 0 can be intensified and the smoothness of the fluctuation curve of the graininess index $GI_{NN}$ can be ensured.

B. Application to Profile Production

Figure 7:
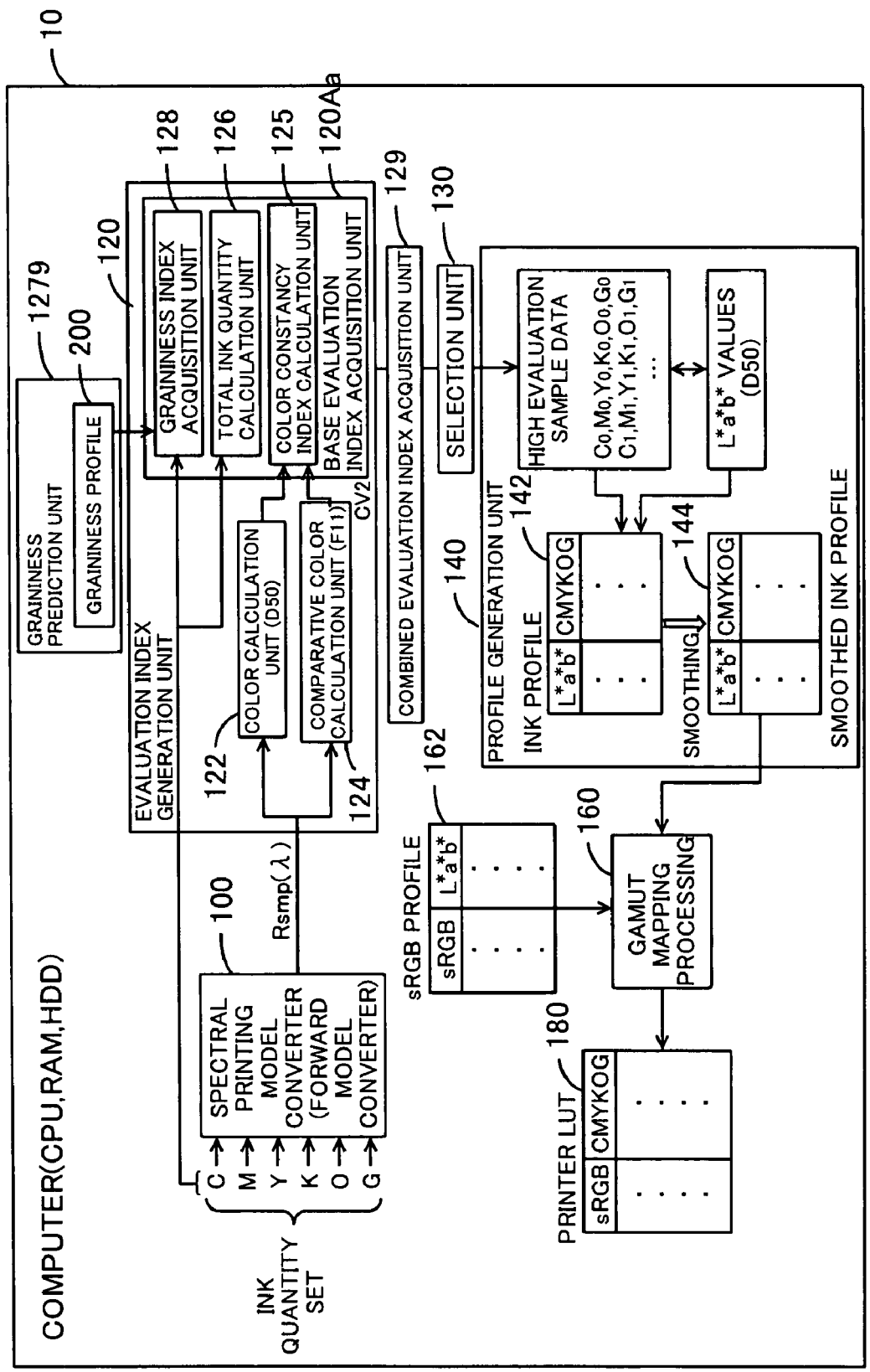
FIG. 7 is a block diagram illustrating by way of an example a configuration example of a profile production apparatus.

FIG. 7 shows the configuration of a profile production device. This profile production device uses the graininess index $GI_{NN}$ predicted with the above-described graininess prediction device to produce a profile relating to the above-described printer PR. Referring to FIG. 7, the profile production device 10 comprises a spectral printing model converter 100, an evaluation index generation unit 120, a selection unit 130, a profile generation unit 140, and a gamut mapping processing unit 160. The profile production device is realized with the same computer as the computer 10 constituting the above-described graininess prediction device of the present embodiment. Each above-described module is executed by taking a RAM as a work area in a CPU (not shown in the figure) and data necessary for each processing are stored in a storage device such as a HDD (not shown in the figure). The spectral printing model converter 100 converts a plurality of ink quantity sets into a spectral reflectance $R_{smp}(\lambda)$ of color patches that are printed according to these ink quantity sets. Ink quantity sets constituted of ink quantities of 6 types are inputted in the spectral printing model converter 100 at 256 gradations each. The spectral printing model converter 100 employs the predetermined spectral printing model and predicts the spectral reflectance $R_{smp}(\lambda)$ of color patches with respect to each ink quantity set. The prediction process will be described below in greater detail.

The evaluation index generation unit 120 comprises a color calculation unit 122, a comparative color calculation unit 124, a color constancy index calculation unit 125, a total ink quantity calculation unit 126, a graininess index acquisition unit 128, and a combined evaluation index acquisition unit 129. The color constancy index calculation unit 125 and the total ink quantity calculation unit 126 calculate the color inconstancy index CII and the total ink quantity TI. The combined evaluation index acquisition unit 129 acquires the combined evaluation index EI that combines the graininess index GI acquired by the graininess index acquisition unit 128, the color inconstancy index CII and the total ink quantity TI. The color calculation unit 122 calculates the color measurement value CV1 under the first observation condition by using the spectral reflectance $R_{smp}(\lambda)$ relating to each ink quantity set. In the present embodiment, a standard light D50 is used as the first observation condition. The color represented by the color measurement value CV1 obtained under the first observation condition is also called "sample color". The comparative color calculation unit 124 calculates the color measurement value CV2 under the second observation condition by using the spectral reflectance $R_{smp}(\lambda)$ relating to each ink quantity set. In the present embodiment, a standard light F11 is used as the second observation condition. The color represented by the color measurement value CV2 obtained under the second observation condition is also called "comparative color".

The color calculation unit 122 and the comparative color calculation unit 124 calculate the color measurement value CV1 and the color measurement value CV2, respectively, under different observation conditions by using the same spectral reflectance $R_{smp}(\lambda)$. By using these color measurement values CV1, CV2, the color constancy index calculation unit 125 calculates the color inconstancy index CII representing the difference in color in the case where the output color of the ink quantity set is observed under different observation conditions.

The graininess index acquisition unit 128 transfers the ink quantity set to the aforementioned graininess prediction program 127, and receives a response in the form of the graininess index $GI_{NN}$ from the graininess prediction unit 1279 of the graininess prediction program 127. In the graininess prediction program 127, the graininess profile 200 was produced in advance, and the graininess index $GI_{NN}$ is calculated and returned as a response by using the graininess profile 200 matching the conditions under which the profile was produced. The graininess index $GI_{NN}$ obtained with the NN will be also represented hereinbelow simply as GI.

The total ink quantity calculation unit 126 acquires the gradation values of CMYKlclm inputted in the spectral printing model converter 100 and calculates the total ink quantity TI in which these gradation values are added up. The combined evaluation index acquisition unit 129 acquires the color inconstancy index CII calculated by a base evaluation index acquisition unit 120a, the total ink quantity TI, and the graininess index GI and combines them linearly to obtain a combined evaluation index EI.

The selection unit 130 selects the ink quantity set having a good combined evaluation index EI as a sample ink quantity set. The profile generation unit 140 generates an ink profile 142 by using the selected sample ink quantity sets and a color measurement values (L*a*b* values) of color patches printed by using these sample ink quantity sets. The ink profile 142 is a lookup table indicating the correspondence relationship between the color measurement values (L*a*b* values) and the ink quantity of CMYKlclm. The "ink profile" is also called the "output device profile". In the present description, the "profile" means a profile that specifies a rule of conversion for performing the conversion of color space and has a broad meaning including a variety of device profiles and lookup tables.

A gamut mapping processing unit 160 generates a printer lookup table 180 by using the ink profile 142 and a sRGB profile 162 that was prepared in advance. Here, for example, a profile that converts the sRGB color space into the L*a*b* color space can be used as the sRGB profile 162. The "sRGB profile" is also called the "input device profile". The printer lookup table 180 serves to convert the input color image data (for example, sRGB data) to the ink quantity data.

Figure 8:
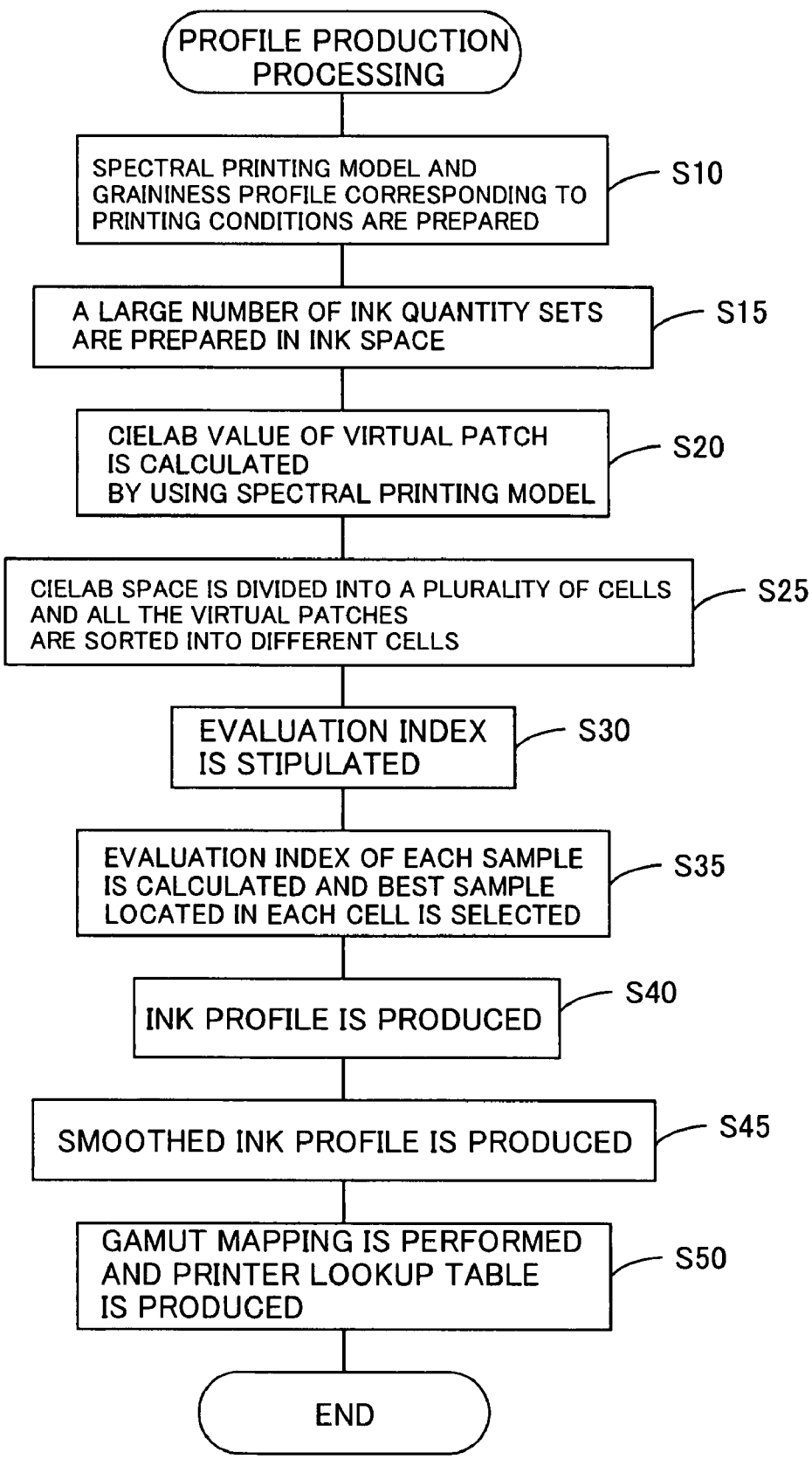
FIG. 8 is a flowchart illustrating by way of an example the processing procedure of profile production.

FIG. 8 shows a flowchart of profile production processing. In step S10, a spectral printing model is determined and the converter 100 is produced. Thus, the spectral printing model converter 100 is prepared that corresponds to printing conditions (ink set and printing medium) that are based on the ink profile 142 and printing lookup table 180. The printing conditions that are based on the ink profile 142 and printing lookup table 180 are designated in advance when the profile production processing is performed. In step S15, a large number of ink quantity sets (CMYKlclm) is set. In the present description, a virtual color patch that is printed according to each ink quantity set is described as a virtual patch. In the present embodiment, ink quantities of 11 points are set with a 10% spacing within a 0-100% range for each ink of CMYKlclm, and all the combinations of quantities of the inks of 6 kinds are prepared as ink quantity sets. Thus, a total of $11^6=1,771,561$ ink quantity sets are prepared. The "ink quantity 100%" means an ink quantity producing a solid print with an ink of one kind.

Figure 9:
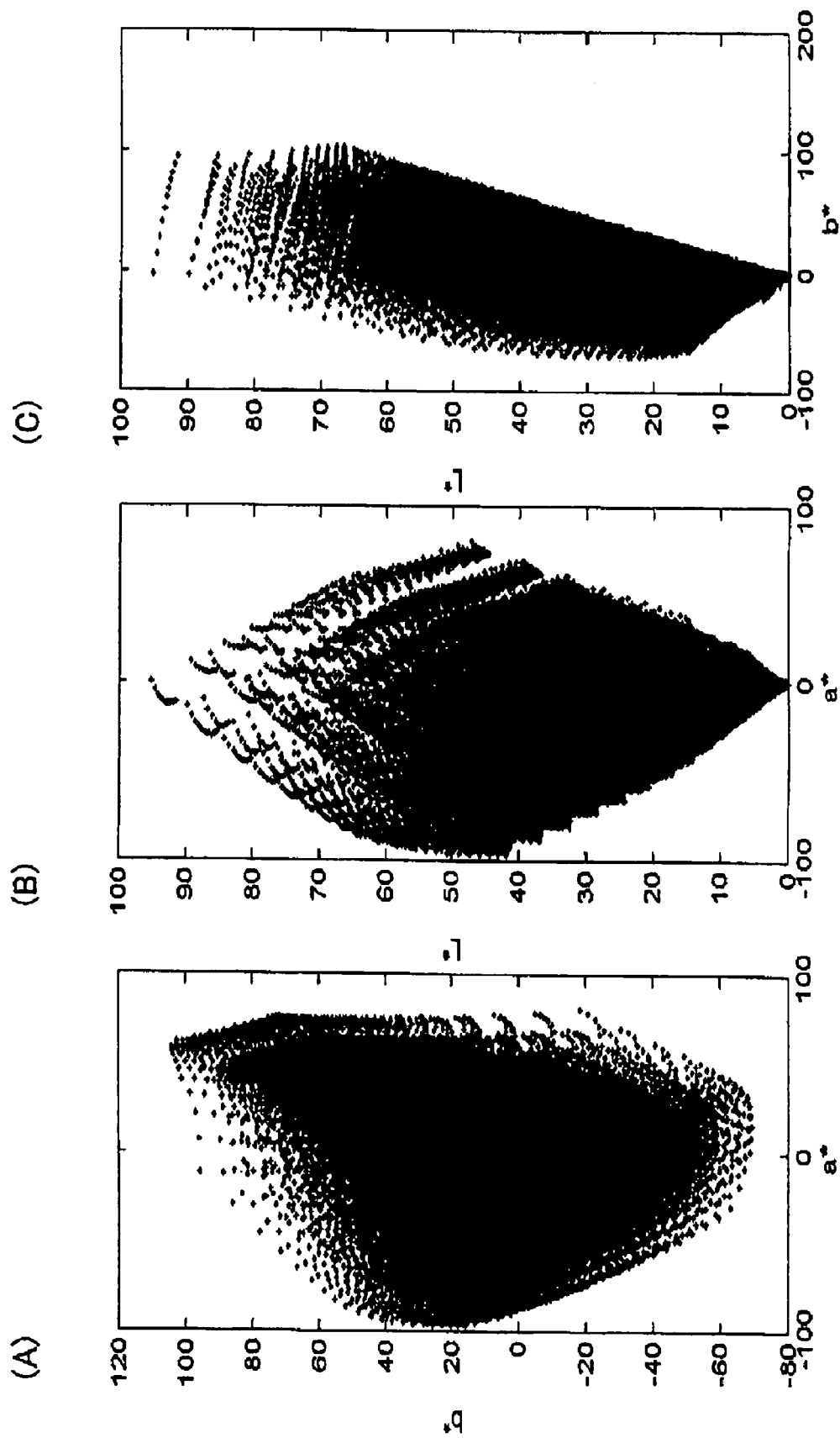
FIG. 9 is a graph illustrating by way of an example a sample color within a CIELAB space in the present embodiment.

In step S20, each ink quantity set is converted into a spectral reflectance $R_{smp}(\lambda)$ by using the spectral printing model converter 100, and the color measurement values L*a*b* of the CIELAB color system is calculated from the spectral reflectance $R_{smp}(\lambda)$. In the present embodiment, the color measurement values of the virtual path were calculated for light D50 of the CIE standard and under observation conditions of CIE1931 2° observer. The color obtained when the virtual path is observed under special observation conditions will be referred to hereinbelow as "sample color". FIGS. 9A-8C show the distributions of sample colors calculated in the present embodiment. The a* and b* axes of the CIELAB color system are plotted respectively against the abscissa and ordinate in FIG. 9A. The ordinate in FIGS. 9(B), (C) shows the a* axis and b*, and the ordinate shows the L* axis.

In step S25, the color space (here, the CIELAB space) of the color measurement values is divided into a plurality of cells, and a plurality of sample colors are sorted with respect to the cells. In the present embodiment, the CIELAB space is assumed to be uniformly divided into 16×16×16 cell. At this time, the virtual patches of each sample color in the CIELAB space are associated with the ink quantity sets prior to conversion thereof with the converter 100. Thus, a large number of ink quantity sets that were prepared in advance are sorted based on the color measurement values of the corresponding virtual patches.

In step S30, a combined evaluation index EI that will be used for selecting the preferred sample is set. The combined evaluation index EI used in the present embodiment is represented by equation (10).

$$EI = k1 \cdot CII + k2 \cdot TI + k3 \cdot GI \tag{10}$$

According to equation (10), the combined evaluation index EI can be calculated by linearly bonding the color inconstancy index CII, graininess index GI, and total ink quantity TI that were provided as the base evaluation indexes and are multiplied by the predetermined weights k1, k2, k3.

For example, the color inconstancy index CII can be calculated by the following equation (11)

$$CII = \left[\left(\frac{\Delta L^*}{2S_L}\right)^2 + \left(\frac{\Delta C^*_{ab}}{2S_S}\right)^2 + \left(\frac{\Delta H^*_{ab}}{S_H}\right)^2\right]^{1/2} \tag{11}$$

Here, $\Delta L^*$, $\Delta C^*_{ab}$, $\Delta H^*_{ab}$ are respectively the lightness difference, chroma difference, and hue difference relating to CV1 and CV2. After the color inconstancy index CII is calculated, the CV1, CV2 of the CIELAB space are converted into the values corresponding to common observation conditions, for example, conditions of a D65 light source by color adaptation transformation (CAT). The color inconstancy index CII is described in Billmeyer and Saltzman's Principles of Color Technology, 3rd edition, John Wiley & Sons, Inc., 2000, p. 129, p. 213-215.

The right side of Equation (11) is equivalent to the color difference $\Delta E^*_{94(2:2)}$ in which the coefficients $k_L$, $k_C$ of lightness and chroma in the CIE1994 color difference equation are set to 2 and the value of the coefficient $k_H$ of hue is set to 1. In the CIE1994 color difference equation, the coefficients $S_L$, $S_C$, $S_H$ that are denominators in the right side of Equation (11) are given by the following Equations (12).

$$S_L = 1$$

$$S_S = 1 + 0.045 C^*_{ab}$$

$$S_S = 1 + 0.015 C^*_{ab} \tag{12}$$

Other equations can be also used as color difference equations for use in the calculation of the color inconstancy index CII.

The color inconstancy index CII is defined as a difference in appearance of color obtained when a certain color patch is observed under first and second different observation conditions. Therefore, from the standpoint of a small apparent color difference under different observation conditions, a sample with a small color inconstancy index CII is preferred.

On the other hand, the graininess index GI can be obtained by substituting each ink quantity CMYKlclm constituting the ink quantity set into the graininess profile 200 in the graininess prediction unit 1279 of the graininess prediction program 127. In the present embodiment, the graininess profile 200 is NN and, therefore, the graininess index GI can be obtained with Equation (13).

$$GI = GI_{NN} = NN(C,M,Y,K,lc,lm) \tag{13}$$

The graininess index GI is the feel of graininess (or the degree of noise) felt by the observer viewing a certain printed matter, and the smaller is the graininess index GI, the less is the graininess feel of the observer. On the other hand, the total ink quantity TI is found by adding up the ink quantities CMYKlclm constituting the ink quantity set. The total ink quantity TI corresponds to the total quantity of ink consumed when a virtual patch is printed, and the smaller is the total ink quantity TI, the lower is the running cost of ink and the risk of blurring is reduced. Therefore, a smaller total amount of ink TI is preferred. In step S30 of the present embodiment, the above-described base evaluation indexes CII, GI, TI were set, but it goes without saying that other evaluation indexes may be also set.

In step S35 of FIG. 8, the combined evaluation index acquisition unit 129 calculates the combined evaluation index EI for each ink quantity set, and the selection unit 130 selects the best virtual patch within each cell of the CIELAB color space correspondingly to this combined evaluation index EI. By selecting a virtual patch, the ink quantity set corresponding to the virtual patch is selected.

Figure 10:
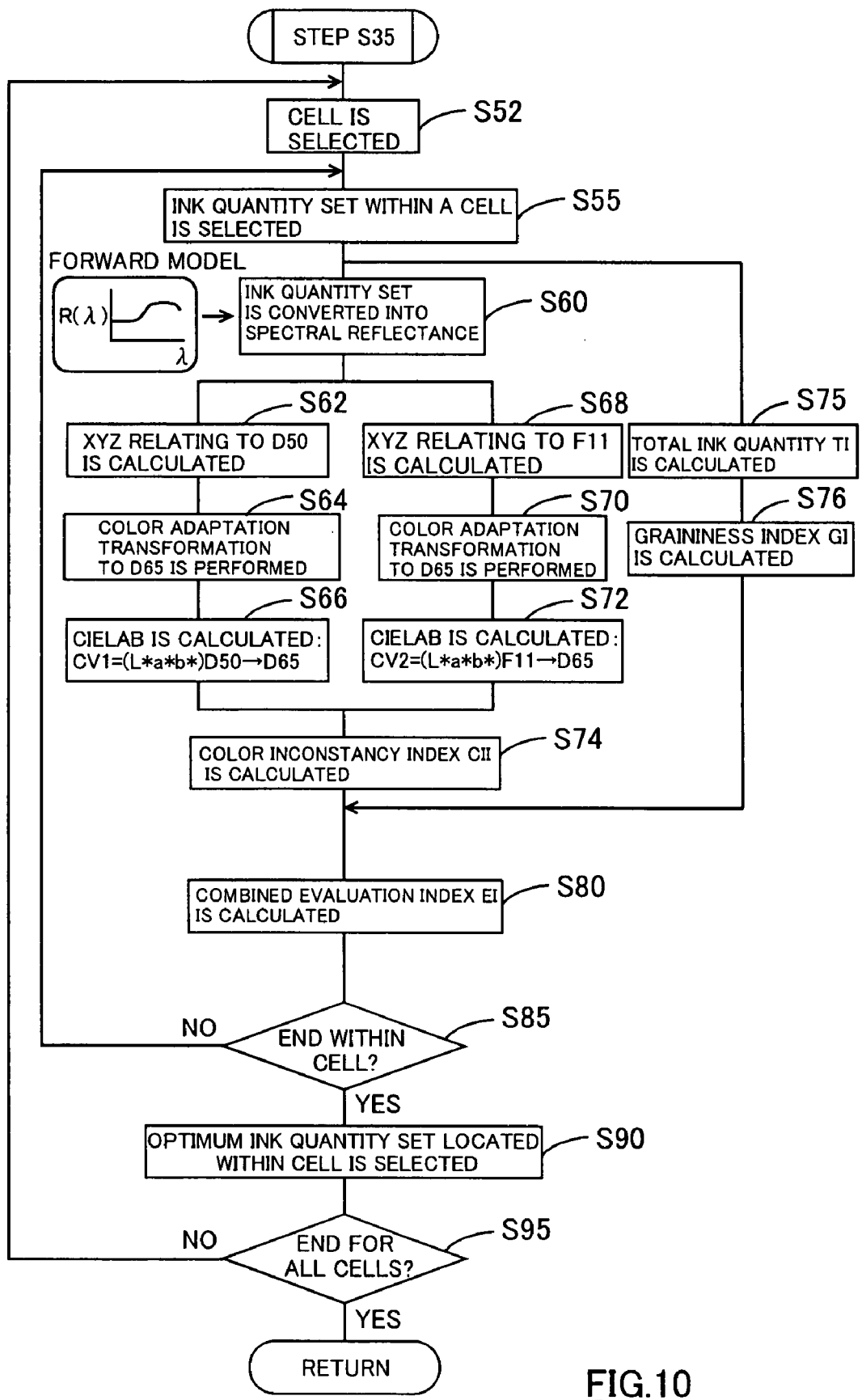
FIG. 10 is a flowchart illustrating by way of an example the detailed procedure of step S35.

FIG. 10 is a flowchart illustrating the procedure of step S35 in greater detail. In step S52, first, one cell is selected. In step S55, an ink quantity set to which the color measurement values of a virtual path belong is selected in the selected cell. Because each ink quantity set has been sorted for each cell in advance in step S25, an ink quantity set that belongs to any cell can be selected. In step S60, the spectral reflectance $R_{smp}(\lambda)$ is calculated by using the spectral printing model converter 100. The following steps S62-S66 are executed with the color calculation unit 122 (FIG. 7) of the base evaluation index generation unit 120a, and steps S68-S72 are executed with a comparative color calculation unit 124 of the base evaluation index generation unit 120a. Step S74 is executed with the color constancy index calculation unit 125. Step S75 is executed with the total ink quantity calculation unit 126, and step S77 is executed with the graininess index acquisition unit 128. Step S80 is executed with the combined evaluation index acquisition unit 129.

The color calculation unit 122 calculates the tristimulus value XYZ under the first observation condition by using the spectral reflectance $R_{smp}(\lambda)$ in step S62. In the present embodiment, the tristimulus value XYZ was calculated for light D50 of the CIE standard and under the observation conditions of CIE1931 2° observer. In the present description, "the observation conditions" mean a combination of an illumination light and an observer, but the CIE1931 2° observer will be used as the observer, unless stated otherwise. In step S64, a color adaptation transformation is applied to the tristimulus value XYZ and the corresponding color under the standard observation conditions is calculated. In the present embodiment, the standard light D65 is used as a light source under the standard observation conditions and CIECAT02 is used as the color adaptation transformation. The CIECAT02 is described, for example, in "The CIECAM02 Color Appearance Model", Nathan Moroney et al., IS&T/SID Tenth Color Imaging Conference, pp. 23-27, and "The performance of CIECAM02", Changjun Li et al., IS&T/SID Tenth Color Imaging Conference, pp. 28-31. However, any other color adaptation transformation such as a color adaptation prediction equation of von Kries can be also used. In step S66, the color measurement value $CV1=(L^*a^*b^*)_{D50 \rightarrow D65}$ of the CIELAB color representation system of the corresponding color is calculated. Here, the superscript index "D50→D65" means a color measurement value obtained by representing the appearance of color under the standard light D50 with the corresponding color of the standard light D65.

The comparative color calculation unit 124 also executes the computations similar to those of the color calculation unit 122 under the second observation conditions. Thus, in step S68, the tristimulus value XYZ is calculated under the second observation conditions by using the spectral reflectance $R_{smp}(\lambda)$. In the present embodiment, the tristimulus value XYZ is calculated under the observation conditions of the light F11 of the CIE standard and the CIE1931 2° observer. In step S70, a color adaptation transformation is applied to the tristimulus value XYZ and the corresponding color under the standard observation conditions is calculated. Then, in step S72, the color measurement value $CV2=(L^*a^*b^*)_{F11 \rightarrow D65}$ of the CIELAB color representation system of the corresponding color is calculated.

The measurement color value $CV1=(L^*a^*b^*)_{D50 \rightarrow D65}$ of the color sample and the color measurement value $CV2=(L^*a^*b^*)_{F11 \rightarrow D65}$ of the comparative color are color measurement values of respective corresponding colors under identical standard observation conditions. Therefore, the color inconstancy index CII (see Equation (11)) that is the color difference ΔE therebetween is a value that rather accurately represents the difference between the appearances of the sample color and comparative color for a virtual patch.

The standard observation condition is not limited to the standard light D65 and the observation condition under any illumination light can be also employed. For example, when the standard light D50 is used as the standard observation condition, step S64 shown in FIG. 9 becomes unnecessary. Furthermore, in step S70, the color adaptation transformation relating to the standard light D50 is executed. However, the color difference ΔE calculated by using the CIELAB color representation system indicates a value with the highest reliability when the standard light D65 is used. From this standpoint, it is preferred that the standard light D65 be used as the standard observation condition.

In step S74, the color constancy index calculation unit 125 (FIG. 7) calculates the color inconstancy index CII by applying the color measurement values CV1, CV2 obtained as described hereinabove to Equation (11). In step S75, the total ink quantity calculation unit 126 acquires the ink quantity set selected in the above-described step S55, and the total ink quantity calculation unit 126 finds the total of ink quantities CMYKlclm. Here, the total ink quantity TI can be calculated by simply adding up the ink quantities CMYKlclm.

In step S76, the ink quantity set selected in the above-described step S55 is acquired by the graininess index acquisition unit 128, and the graininess index acquisition unit 128 transfers the ink quantity set to the graininess prediction program 127. Then, the ink quantity set is substituted in the Equation (13) (actually, Equations (1) to (3)) in the graininess prediction unit 1279 of the graininess prediction program 127, and the graininess index GI ($GI_{NN}$) is calculated. The calculated graininess index GI is acquired by the graininess index acquisition unit 128. In step S10 shown in FIG. 8, when the ink profile 142 and printer lookup table 180 are produced, the printing medium and ink set for which the ink profile 142 and printer lookup table 180 are produced are designated and the graininess index GI is calculated in the NN corresponding to this designation.

If the color inconstancy index CII, total ink quantity TI, and graininess index GI can be acquired by the above-described processing, then the combined evaluation index acquisition unit 129 calculates the combined evaluation index EI in step S80 by substituting the values CII, GI, TI that have been heretofore obtained into Equation (10). In step S85, it is determined whether the calculation of the combined evaluation index EI has been completed with respect to all the ink quantity sets contained in the cell that is the processing object. The combined evaluation index EI is thus calculated with respect to all the ink quantity sets within the cell by repeatedly executing the steps S55-S85.

In step S90, taking the ink quantity set for which the combined evaluation index EI becomes the smallest as an optimum ink quantity set from amongst the sample colors located in a cell, the selection unit 130 selects such an ink quantity set as a sample ink quantity set relating to this cell. Where the sample ink quantity sets are selected, whether the sample ink quantity sets have been selected with respect to all the cells is determined in step S95, and when the selection has not been completed with respect to all the cells, the next cell is selected in step S52. As a result, the processing can be repeated with respect to each cell containing at least one ink quantity set until one sample ink quantity set is selected for each cell. The sample ink quantity set will be also referred to hereinbelow as "high evaluation sample".

A cell containing absolutely no corresponding ink quantity sets is also present among a plurality of cells obtained by the division made in step S25. Therefore, the processing of FIG. 10 is executed by taking as an object the cells containing at least one ink quantity set and excluding the cells that do not contain even one ink quantity set from the processing object. Once the sample ink quantity sets have thus been selected for all the cells for which the sample ink quantity set can be selected, an ink profile 142 is produced in step S40 by associating the color measurement value of the CIELAB and the ink quantity set. This color measurement value may be a color measurement value calculated in the above-described step S66 or S72, and the color measurement value matching the light source of the printing environment in which printing is performed by using the printer lookup table 180 may be also calculated.

Because there are $16^3$ cells as was described hereinabove, the number of sample ink quantity sets that were selected in step S35 is equal to or less than $16^3$. The number or color of samples with the ink quantity stipulated in the printer lookup table 180 that is used in a general purpose printer does not necessarily match the sample ink quantity set. Accordingly, the color measurement value corresponding to an arbitrary ink quantity set has to be interpolation calculated with reference to the sample ink quantity set. If the representative samples are irregularly arranged in the CIELAB space, the accuracy of interpolation computation is decreased regardless of whether the linear interpolation or non-linear interpolation is employed as the interpolation computation method. If the accuracy of interpolation computation is poor, the conversion accuracy during color conversion in the printer lookup table 180 is also poor and high-quality printing results cannot be obtained in printing using the printer lookup table 180.

Accordingly, in step S45, a smoothing processing is performed with respect to the ink profile 142, the sample ink quantity set that enables the implementation of interpolation computation with a high accuracy is selected again, and the smoothed ink profile 144 is produced. The smoothing processing can be performed by employing a technology disclosed in Japanese Patent Application Laid-open No. 2004-320624, 2004-320625, or 2004-320626. If the smoothed ink profile 144 is produced, an equally-spaced lookup table 180 is produced in order to facilitate the interpolation processing when the aforementioned printer lookup table 180 is produced.

Once the equally-spaced profile that stipulates the corresponding relationship between the equally-spaced Lab grid and ink quantity has thus been produced, in step S50 shown in FIG. 8, the gamut mapping processing unit 160 (FIG. 7) performs gamut mapping based on the above-described equally-spaced profile and sRGB profile 162 and produces the printer lookup table 180. The gamut processing is performed because there is a difference between the color region of a color space (also called the "ink color space") that can be realized in the printer and the color region that can be realized in the input color space (sRGB space in the present embodiment). The color region of the ink color space is regulated by the above-described equally-spaced profile, and the color region of the input color space is regulated by the sRGB profile 162. Because the input color space and ink color space generally intersect, the color region of the input color space has to be mapped on the color region of the ink color space.

Figure 11:
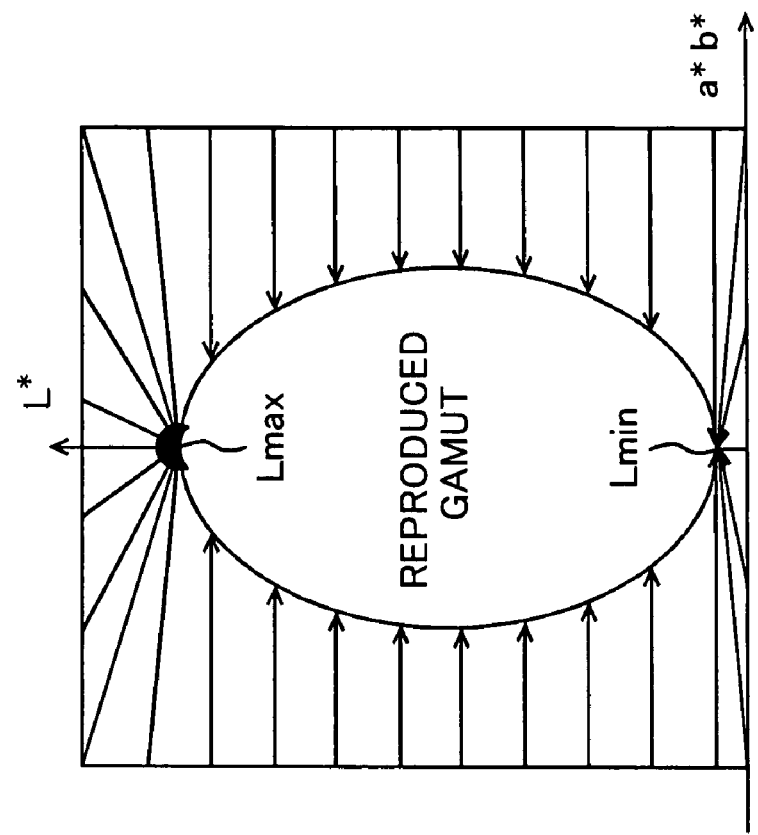
FIG. 11 illustrates by way of an example the gamut mapping in step S50.
Figure 11:
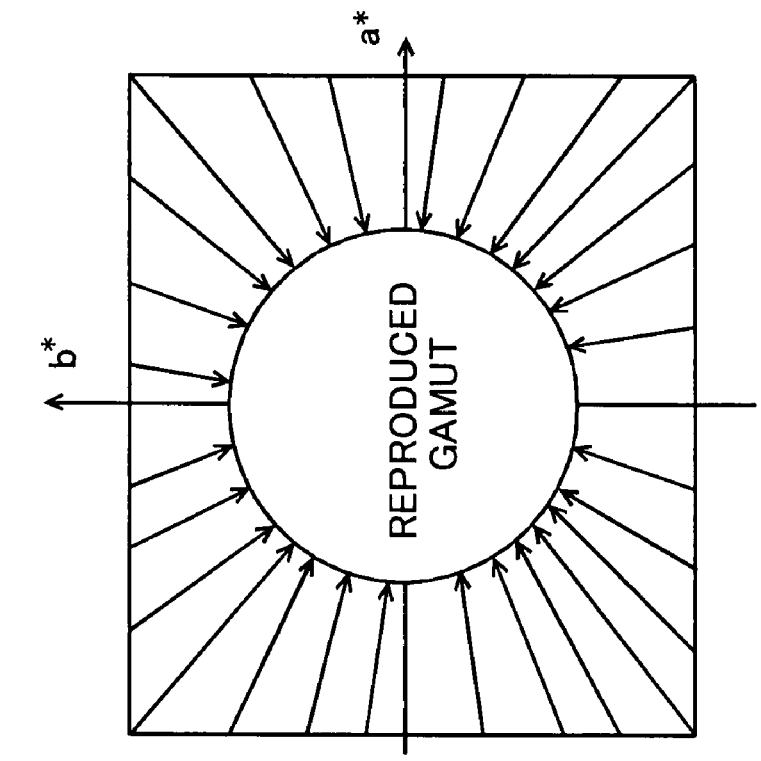

FIG. 11A and FIG. 11B show an example of gamut mapping. Here, the so-called gamut clipping method is employed. More specifically, as shown in FIG. 11A, the color of the sRGB color space that is outside the color region of the ink color space is mapped so as to decrease the chroma, while maintaining the hue. As for the lightness L*, the lightness is maintained for the color located within the lightness range of the ink color space. The color having a lightness that is larger than the maximum value $L_{max}$ of the lightness of the ink color space is mapped on the maximum value $L_{max}$. On the other hand, the color that has a lightness larger than the minimum value $L_{min}$ of the lightness of the ink color space is mapped on the minimum value $L_{min}$. A variety of methods are known for gamut mapping and any of these methods may be used.

If the gamut mapping is thus performed, the final printer lookup table 180 is completed. This printer lookup table 180 is a lookup table that inputs the sRGB data and outputs ink quantities of inks of 6 types. If such a printer lookup table 180 is installed in a printer, then a printed matter with a high color constancy (that is, a small variation of the appearance of color under different observation conditions) can be produced. Furthermore, the graininess felt by people can be inhibited by the printed matter.

In particular, because graininess can be inhibited for the flesh color, sky blue, and gray color for which people easily feel the graininess, a printed matter with a lower level of grainy feel can be obtained. Likewise, because color constancy can be improved for the flesh color, sky blue, and gray color that are memory colors for people and easily attract attention, a printed matter can be obtained for which the impression on the viewer is hardly affected by light source fluctuations. Further, data identifying the printing conditions based on the ink profile 142 and printer lookup table 180 that were designated in advance when the profile production processing was performed are added to the ink profile 142 and printer lookup table 180, whereby the ink profile 142 and printer lookup table 180 complying with the designated printing conditions can be used each time the printing is performed with the printer.

In the above-described embodiment, the printer lookup table 180 stipulating the corresponding relationship between the sRGB and CMYKlclm was produced, but it goes without saying that other modes can be employed for the profile. For example, the present invention can be also applied to producing a media profile in a configuration in which color conversion is performed by using a source profile that converts an inputted device-dependent color into a device-independent color and a media profile that converts the device-independent color into the output device-dependent color. In this case, the media profile is produced by equally spacing the grid points from the smoothed ink profile 144 and gamut mapping them in the Lab space. Thus, if a profile is produced in which the grid points were equally spaced from the smoothed ink profile 144, the printer gamut is established. Therefore, the grid points of the CIELAB space that are present outside the gamut are associated with the grid point on the gamut surface or inside the gamut. As a result, with the profile produced, any CIELAB value obtained form the source profile can be converted into the CMYKlclm.

C. Example of Spectral Printing Model

A cellular Yule-Nielsen spectral Neugebauer model will be explained below as an example of a spectral printing model. This model is based on the well-known spectral Neugebauer model and Yule-Nielsen model. In the explanation below, a mode relating to the case in which inks of three types (CMY) are used will be described, but the model can be easily expanded to a model using any large number of inks. The cellular Yule-Nielsen spectral Neugebauer model is described in Color Res. Appl. 25, 4-19, 2000, R. Balasubramanian, Optimization of the spectral Neugebauer model for printer characterization, J. Electronic Imaging 8(2), 156-166 (1999).

Figure 12:
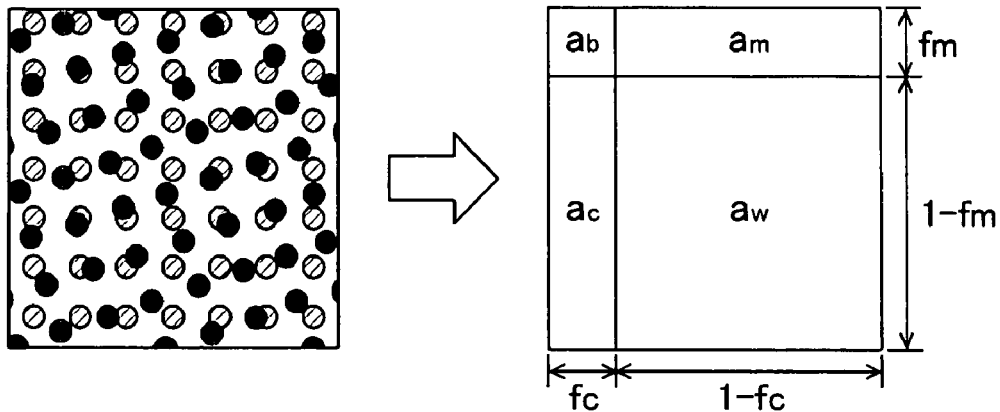
FIG. 12 illustrates by way of an example the Spectral Neugebauer Model.
Figure 12:
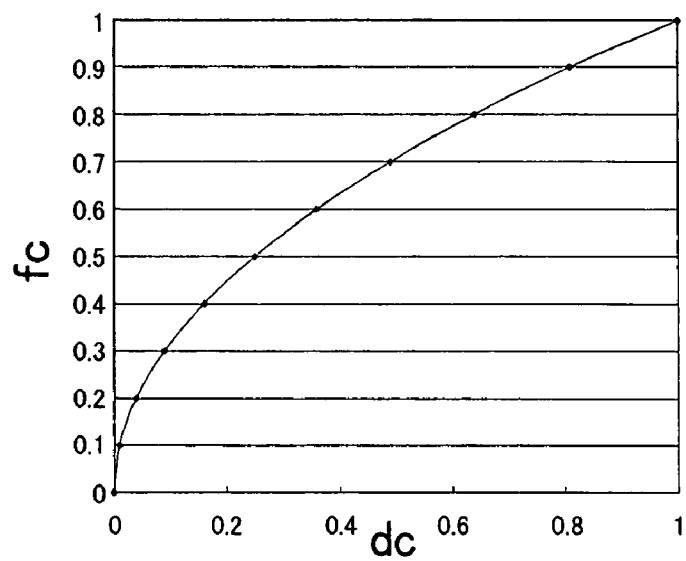

FIG. 12 shows a spectral Neugebauer model. In the spectral Neugebauer model, the spectral reflectance $R(\lambda)$ of any printed matter can be given by the following Equation (14)

$$R(\lambda) = a_w R_w(\lambda) + a_c R_c(\lambda) + a_m R_m(\lambda) + \\ a_y R_y(\lambda) + a_r R_r(\lambda) + a_g R_g(\lambda) + a_b R_b(\lambda) + a_k R_k(\lambda) \quad (14)$$

$$a_w = (1 - f_c)(1 - f_m)(1 - f_y)$$
$$a_c = f_c(1 - f_m)(1 - f_y)$$
$$a_m = (1 - f_c)(f_m)(1 - f_y)$$
$$a_y = (1 - f_c)(1 - f_m)f_y$$
$$a_r = (1 - f_c)f_m f_y$$
$$a_g = f_c(1 - f_m)f_y$$
$$a_g = f_c f_m(1 - f_y)$$
$$a_k = f_c f_m f_y$$

Here, $a_i$ is a surface area ratio of the i-th region, $R_i(\lambda)$ is a spectral reflectance of the i-th region. Index "i" means respectively a region (w) where no ink is present, a region (c) where only the cyan ink is present, a region (m) where only the magenta ink is present, a region (y) where only the yellow ink is present, a region (r) where the magenta ink and the yellow ink are discharged, a region (g) where the yellow ink and the cyan ink are discharged, a region (b) where the cyan ink and the magenta ink are discharged and a region (k) where the three CMY inks are discharged. Further, $f_c$, $f_m$, $f_y$ are the ratios of surface area covered by the ink when only one of CMY inks is discharged (ink area coverage). The spectral reflectance $R_i(\lambda)$ is acquired by measurements with a spectral reflectometer.

The ink area coverage ratios $f_c$, $f_m$, $f_y$ are given by a Murray-Davis model shown in FIG. 12B. In the Murray-Davis model, for example, the ink area coverage $f_c$ is a nonlinear function of the ink discharge quantity $d_c$ of cyan and given in the form of a one-dimensional lookup table. The ink area coverage is a nonlinear function of the ink discharge quantity because the ink spreads sufficiently when a small amount of ink is discharged in a unit surface area, but when a large amount of ink is discharged, the ink piles up and the surface area covered by the ink does not increase.

If a Yule-Nielsen model relating to spectral reflectance is applied, Equation (14) can be written as Equation (15a) or Equation (15b) below $$R(\lambda)^{1/n} = a_w R_w(\lambda)^{1/n} + a_c R_c(\lambda)^{1/n} + a_m R_m(\lambda)^{1/n} + a_y R_y(\lambda)^{1/n} + \\ a_r R_r(\lambda)^{1/n} + a_g R_g(\lambda)^{1/n} + a_b R_b(\lambda)^{1/n} + a_k R_k(\lambda)^{1/n}$$
(15a)

$$R(\lambda) = \left\{ \begin{array}{l} a_w R_w(\lambda)^{1/n} + a_c R_c(\lambda)^{1/n} + a_m R_m(\lambda)^{1/n} + a_y R_y(\lambda)^{1/n} + \\ a_r R_r(\lambda)^{1/n} + a_g R_g(\lambda)^{1/n} + a_b R_b(\lambda)^{1/n} + a_k R_k(\lambda)^{1/n} \end{array} \right\}^n$$
(15b)

Here, n is a predetermined coefficient of 1 or more; for example, n can be set to 10. Equation (15a) and Equation (15b) represent a Yule-Nielsen spectral Neugebauer model.

The cellular Yule-Nielsen spectral Neugebauer model is obtained by dividing the ink color space of the aforementioned Yule-Nielsen spectral Neugebauer model into a plurality of cells.

Figure 13:
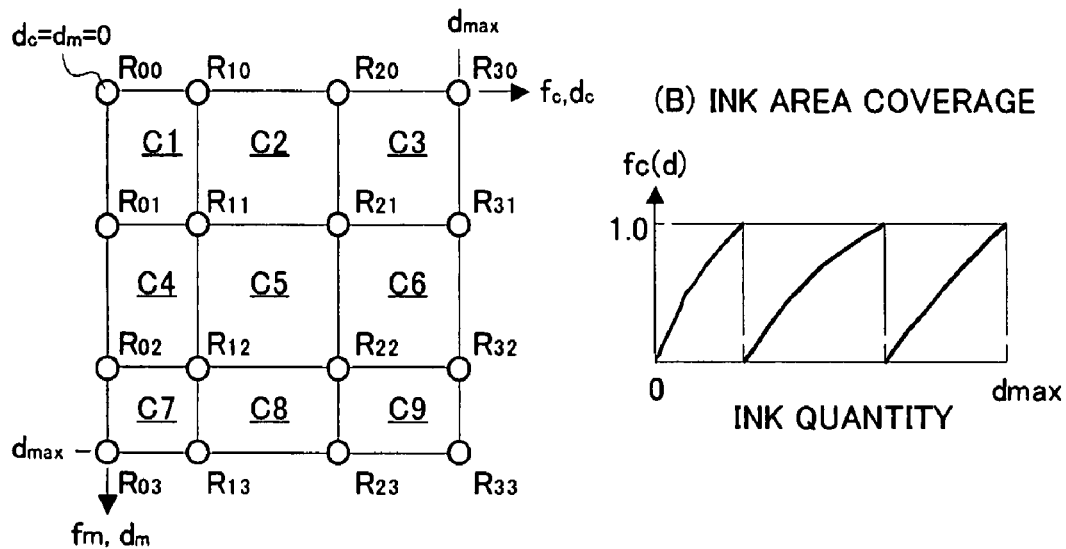
FIG. 13 illustrates by way of an example the Cellular Yule-Nielsen Spectral Neugebauer Model.
Figure 13:
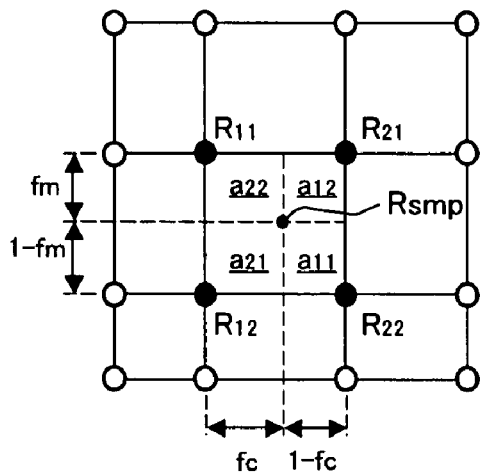

FIG. 13A shows an example of cell division in the cellular Yule-Nielsen spectral Neugebauer model. Here, for the sake of simplicity, the cell division is plotted in a two-dimensional space comprising two axes of the cyan ink area coverage $f_c$ and magenta area coverage $f_m$. The two axes $f_c$ and $f_m$ can be also considered as the axes indicating the ink discharge quantities $d_c$, $d_m$. White circles are grid points (referred to as "nodes") of cell division, and the two-dimensional space is divided into nine cells C1-C9. Spectral reflectance R00, R10, R20, R30, R01, R11, . . . , R33 are determined in advance with respect to a printed matter (color patch) in 16 nodes.

FIG. 13B shows the shape of the ink area coverage $f_c(d)$ corresponding to this cell division. Here, the range $0-d_{max}$ of ink quantity of ink of one kind is divided into three sectors, and the ink area coverage $f_c(d)$ is represented by a curve that increases monotonously from 0 to 1 in each sector.

FIG. 13C illustrates a method for calculating the spectral reflectance $R_{smp}(\lambda)$ of a sample in the central cell C5 in FIG. 13A. The spectral reflectance $R_{smp}(\lambda)$ is given by the following Equation (16).

$$R_{smp}(\lambda) = \left( \sum a_w R_w(\lambda)^{1/n} \right)^n \\ = (a_{11} R_{11}(\lambda)^{1/n} + a_{12} R_{12}(\lambda)^{1/n} + a_{21} R_{21}(\lambda)^{1/n} + a_{22} R_{22}(\lambda)^{1/n})^n$$
(16)

$$a_{11} = (1 - f_c)(1 - f_m)$$
$$a_{12} = (1 - f_c) f_m$$
$$a_{21} = f_c (1 - f_m)$$
$$a_{22} = f_c f_m$$

Here, the ink area coverage $f_c$, $f_m$ are the values given by the graph shown in FIG. 13C and are defined within the cell C5. Further, the values of spectral reflectance $R11(\lambda)$, $R12(\lambda)$, $R21(\lambda)$, $R22(\lambda)$ in the four apex points of the cell CS are adjusted so as to give accurately the sample spectral reflectance $R_{smp}(\lambda)$ according to Equation (16).

If the ink color space is thus divided into a plurality of cells, the sample spectral reflectance $R_{smp}(\lambda)$ can be calculated with better accuracy than in the case without such division. FIG. 14 shows node values of cell division employed in the present embodiment. As shown in this example, it is preferred that the node values of cell division be set independently for each ink. However, in the model shown in FIG. 13A, the spectral reflectance in all the nodes is usually impossible to obtain by measuring the color patch. This is because if a large amount of ink is discharged, blurring occurs and a color patch of uniform color is impossible to print.

Figure 15:
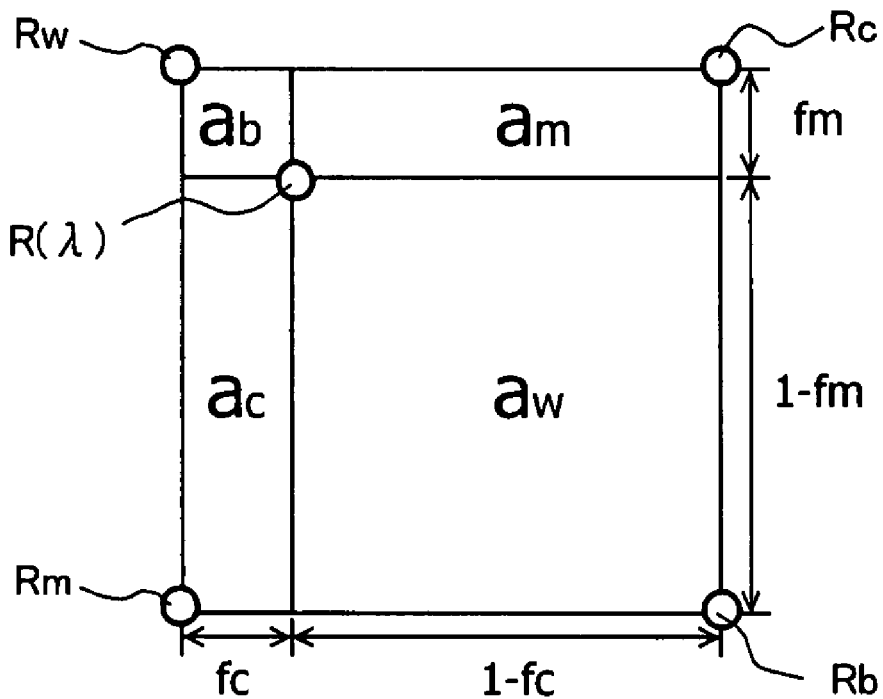
FIG. 15 illustrates a method for finding a spectral reflectance that cannot be measured in the Cellular Yule-Nielsen Spectral Neugebauer Model.

FIG. 15 shows a method for finding the spectral reflectance that cannot be measured. This example relates to the case in which only the inks of two kinds (cyan and magenta) are used. The sample spectral reflectance $R(\lambda)$ of any color patch printed with the inks of two kinds (cyan and magenta) is given by Equation (17) below.

$$R(\lambda)^{1/n} = a_w R_w(\lambda)^{1/n} + a_c R_c(\lambda)^{1/n} + a_m R_m(\lambda)^{1/n} + a_b R_b(\lambda)^{1/n}$$

$$a_w = (1 - f_c)(1 - f_m)$$

$$a_c = f_c (1 - f_m)$$

$$a_m = (1 - f_c) f_m$$

$$a_b = f_c f_m$$
(17)

Let us assume that amongst a plurality of parameters contained in Equation (17), only the spectral reflectance $Rb(\lambda)$ obtained in the case of 100% discharge quantity of both the cyan ink and the magenta ink are unknown and values of other parameters are known. In this case, if Equation (17) is modified, Equation (18) can be obtained.

$$R_b(\lambda) = \left\{ \frac{R(\lambda)^{1/n} - a_w R_w(\lambda)^{1/n} - a_c R_c(\lambda)^{1/n} - a_m R_m(\lambda)^{1/n}}{a_b} \right\}$$
(18)

As mentioned above, all the terms in the right side are already known. Therefore, the unknown spectral reflectance $Rb(\lambda)$ can be calculated by solving Equation (18). The estimation of spectral reflectance is described in R. Balasubramanian, Optimization of the spectral Neugebauer model for printer characterization, J. Electronic Imaging 8(2), 156-166 (1999).

The spectral reflectance of secondary colors other than the secondary colors of cyan and magenta also can be found in a similar manner. Further, if the spectral reflectance of a plurality of secondary color is found, then the spectral reflectance of a plurality of tertiary colors also can be found in a similar manner. The spectral reflectance for each node of the ink color space that was divided into cells can be found by successively finding the spectral reflectance of higher orders in such manner.

The spectral printing converter 100 shown in FIG. 7 has the values of spectral reflectance in each node of the ink color space that was divided into cells as shown in FIG. 13A and the one-dimensional lookup table showing the ink area coverage shown in FIG. 13C and is configured so as to calculate the sample spectral reflectance $R_{smp}(\lambda)$ relating to any sample ink quantity data by using these values and table.

Generally, the spectral reflectance of the printed color patch depends on the ink set and printing medium. Therefore, the spectral printing converter 100 shown in FIG. 7 is produced for each combination of ink set and printing medium. As a consequence, the spectral printing converter 100 corresponding to the combination of ink set and printing medium based on the ink profile 142 and printer lookup table 180 is appropriately prepared. If the printing medium is changed, at least the spectral reflectance $R_w(\lambda)$ changes. Therefore, the spectral printing converter 100 using the spectral reflectance $R_w(\lambda)$ corresponding to the printing medium has to be prepared.

It goes without saying that if the ink set is changed, the configuration of inks used also changes. Therefore, the spectral printing converter 100 in which the spectral reflectance $R_i(\lambda)$ of each ink corresponds to the ink set has to be prepared. In step S10 shown in FIG. 8, when the ink profile 142 and the printer lookup table 180 are produced, the printing medium and the ink set for which the ink profile 142 and the printer lookup table 180 are to be produced are designated, and the spectral printing converter 100 corresponding to this designation is prepared.

D. Modification Example

In the above-described example, the graininess index $GI_{NN}$ relating to an arbitrary ink quantity set was calculated based on the NN learned with the graininess indexes GI of color patches relating to a plurality of test ink quantity sets, but the graininess index GI relating to an arbitrary ink quantity set may be also calculated based on other methods. For example, the graininess profile 200 may be produced with another formats. In the above-described embodiment, NN was produced as the graininess profile 200 in step S285 based on the corresponding data CD that were stored in step S280 illustrated by FIG. 2, but the graininess profile 200 of another format may be produced on the corresponding data CD.

FIG. 16 shows schematically a lookup table (LUT) that serves as a graininess profile 200 of a modification example. In the LUT shown in the figure, the graininess index GI corresponding to the ink quantity set on the grid points with a constant spacing in the ink quantity space is represented. In step S200, the test ink quantity set preparation unit 1271 generates randomly the test ink quantity sets. Therefore, in the corresponding data CD, no test ink quantity set is present in the grid points with a constant spacing. Therefore, when a LUT is produced, a representative ink quantity set on grid points is generated and the graininess index GI corresponding to the representative ink quantity set is calculated by interpolation computation based on the corresponding data CD. Further, the LUT can be produced by describing the calculated graininess index GI and representative ink quantity set. The below described interpolation computation can be easily performed with the LUT in which correspondence relationship is described with respect to the representative ink quantity set on the grid points with a constant spacing. The corresponding data CD can be directly used as the LUT by generating a test ink quantity set on the grid points in advance in step S200 shown in FIG. 2.

However, in the LUT, the graininess index GI corresponding only to the representative ink quantity set on the grid points is described. Therefore, it is necessary to prepare an interpolation method for calculating the graininess index GI relating to LUT and an arbitrary ink quantity set other than the representative ink quantity set. More specifically, an interpolation method can be applied by which interpolation of the graininess index GI of an arbitrary ink quantity set is performed by using a weight coefficient based on the mutual arrangement of an arbitrary ink quantity set in the ink quantity space and the representative ink quantity sets surrounding this ink quantity set. The weight coefficient based on the mutual arrangement of an arbitrary ink quantity set in the ink quantity space and the representative ink quantity sets surrounding this ink quantity set may be determined by the distance between an arbitrary ink quantity set in the ink quantity space and the representative ink quantity sets surrounding this ink quantity set or by the volume of a tetrahedron for which the arbitrary ink quantity set is an apex. It goes without saying that spline interpolation can be also applied.

Further, when the corresponding relationship between the test ink quantity set in the corresponding data CD and the graininess index GI can be approximated by an approximation formula, the graininess index GI corresponding to an arbitrary ink quantity set can be also calculated by this approximation formula. For example, the graininess index GI can be calculated by a polynomial approximation formula having each ink quantity as a variable of a predetermined order. As for the polynomial approximation formula, the coefficients and constants may be optimized, for example, by a least-square method. This approach is effective when the possibility of approximating the corresponding relationship between the test ink quantity set and graininess index GI by a polynomial expression has been clarified in advance and in the case where the number of kinds of inks constituting an ink set is small.

E. Conclusion

Printing of a color patch is performed in a printer PR according to a plurality of test ink quantity sets, and the color patch is image inputted with a scanner SC. A graininess index GI corresponding to each test ink quantity set is calculated by analyzing the image data obtained with the scanner SC. As a result, corresponding data CD that stipulate the corresponding relationship between the test ink quantity sets and the graininess index GI can be obtained, and a neural network serving as the graininess profile 200 is created by using the corresponding data CD as a master signal. The graininess index GI relating to an arbitrary ink quantity set can be accurately predicted with the neural network.

What is claimed is:

1. A method for predicting a graininess on a printing medium when printing is performed according to an ink quantity set of inks that can be used in a printer, the method comprising:
    (a) image inputting a color patch that has been printed based on a plurality of test ink quantity sets prepared in advance;
    (b) calculating a graininess index, using a computer, based on an inputted color patch image; and
    (c) predicting the graininess index on the printing medium when printing is performed according to any ink quantity set based on a graininess profile produced based on a corresponding relationship between the test ink quantity set and the graininess index.

2. The method according to claim 1, wherein the graininess profile is a neural network in which each parameter is optimized based on the corresponding relationship between the test ink quantity set and the graininess index.

3. The method according to claim 2, wherein each parameter of the neural network is optimized so as to reduce an error between the graininess index obtained by inputting the test ink quantity set into the neural network and the graininess index obtained by evaluating the color patch.

4. The method according to claim 3, wherein each parameter of the neural network is optimized so as not to over-reduce the error between the graininess index obtained by inputting the test ink quantity set into the neural network and the graininess index obtained by evaluating the color patch.

5. The method according to claim 4, wherein the graininess profile is a lookup table recording the corresponding relationship between the test ink quantity set and the graininess index.

6. An apparatus for predicting a graininess on a printing medium when printing is performed according to an ink quantity set of inks that can be used in a printer, the apparatus comprising:
an input unit that image inputs a color patch that has been printed based on a plurality of test ink quantity sets prepared in advance;
a production unit that calculates a graininess index based on the inputted image and produces a graininess profile based on a corresponding relationship between the ink quantity set and the graininess index; and
a prediction unit that predicts the graininess index on the printing medium when printing is performed according to any ink quantity set based on the graininess profile.

7. A method for producing a profile that stipulates a corresponding relationship between ink quantity data that represent ink quantity sets of a plurality of inks that can be used in a printer and a color measurement value obtained when printing is performed in the printer according to the ink quantity data,
the method comprising the steps of:
(a) image inputting a color patch that has been printed based on a plurality of test ink quantity sets prepared in advance;
(b) calculating a graininess index, using a computer, based on an inputted color patch image;
(c) predicting the graininess index on the printing medium when printing is performed according to an arbitrary ink quantity set based on a graininess profile produced based on a corresponding relationship between the test ink quantity set and the graininess index; and
(d) producing the profile based on a corresponding relationship between the ink quantity set for which at least the graininess index predicted is favorable and a color measurement value obtained when printing is performed with the ink quantity set.

* * * * *